US012749078B2

(12) United States Patent
Thampi

(10) Patent No.: US 12,749,078 B2
(45) Date of Patent: Sep. 29, 2026

(54) SYSTEM TO PREVENT FRAUDS AND AUTHENTICATE USERS FOR THIRD PARTY APPLICATIONS WHILE TOKEN PROCESSING

(71) Applicant: Visa International Service Association, San Francisco, CA (US)

(72) Inventor: Wilson Thampi, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 319 days.

(21) Appl. No.: 18/359,628

(22) Filed: Jul. 26, 2023

(65) Prior Publication Data

US 2025/0037126 A1 Jan. 30, 2025

(51) Int. Cl.
*G06Q 20/40* (2012.01)

(52) U.S. Cl.
CPC ..... *G06Q 20/4012* (2013.01); *G06Q 20/4016* (2013.01); *G06Q 20/409* (2013.01)

(58) Field of Classification Search
None
See application file for complete search history.

(56) References Cited

U.S. PATENT DOCUMENTS

| | | | | |
|---|---|---|---|---|
| 10,891,618 | B2 * | 1/2021 | Kinch | G06Q 20/3823 |
| 2015/0350211 | A1 * | 12/2015 | Burgess | H04L 63/10 726/30 |
| 2018/0018672 | A1 | 1/2018 | Shauh | |
| 2019/0213596 | A1 * | 7/2019 | Kallugudde | G06Q 20/367 |
| 2019/0303915 | A1 * | 10/2019 | Hammad | G06Q 20/3227 |
| 2021/0217005 | A1 * | 7/2021 | Mehrhoff | G06Q 20/4014 |
| 2023/0067507 | A1 * | 3/2023 | Seton | G06Q 20/4014 |

OTHER PUBLICATIONS

Kini et al., Secured Authentication Using Mobile Phone as Security Token, International Journal of Scientific & Engineering Research (Jul. 2014), 5(7):1410-1415.

* cited by examiner

*Primary Examiner* — Chrystina E Zelaskiewicz
(74) *Attorney, Agent, or Firm* — K&L Gates LLP

(57) ABSTRACT

Systems and methods of preventing fraud and authenticating users while processing a token on a token provider computer, a token gateway computer, and a mobile device are disclosed.

9 Claims, 10 Drawing Sheets

SYSTEM TO PREVENT FRAUDS AND AUTHENTICATE USERS FOR THIRD PARTY APPLICATIONS WHILE TOKEN PROCESSING

TECHNICAL FIELD

The present disclosure relates generally to mobile payment systems. More particularly, the present disclosure related to preventing fraud and authenticating a mobile device while token processing.

SUMMARY

In one general aspect, the present disclosure provides methods and systems for preventing fraud and authenticating users while processing a token on a token provider server computer. The system comprises a token provider server computer, a payment network comprising a token gateway server computer, a mobile device running a banking application (e.g., an open banking application) and a secure element, and mobile communication network operated by a mobile service provider.

According to at least aspect, the present disclosure provides a method of preventing fraud and authenticating users while processing a token on a token provider computer. The method comprising receiving, by a token provider computer, a personal account number (PAN) information and a mobile device number from a banking application running on a mobile device; enrolling, by the token provider computer, the PAN information and the mobile device number; establishing communication, by the token provider computer, with a token gateway computer to determine a tokenization of card details with a token during a financial transaction process; receiving, by the token provider computer, a pending state token from the token gateway computer upon completion of validation of the PAN, a card expiry information, and a card postal code; transmitting, by the token provider computer, the pending state token to the banking application running on the mobile device to associate the pending state token with the mobile device; receiving, by the token provider computer, a validation request from the banking application for a push one-time password (OTP) value; transmitting, by the token provider computer, the push OTP to the token gateway computer; and receiving, by the token provider computer, a token validated state message from the token gateway computer.

In another of the method, the banking application running on the mobile device is an open banking application.

In another aspect, the method comprises sharing, by the token provider computer, the PAN information, the mobile device number, a mobile device identification, and card validity with the token gateway computer.

In another aspect, the method comprises transmitting, by the token provider computer, the token validated state message to the mobile device.

In another aspect, the method comprises creating a token based on the PAN information and the mobile device number on the mobile device.

In another aspect, the method comprises receiving, by the token provider computer, from the banking application a notification of a high risk transaction; and declining the token for the high risk transaction.

In another aspect, the present disclosure provides a method of preventing fraud and authenticating users while processing a token on a token gateway computer. The method comprising receiving, by a token gateway computer, a personal account number (PAN) information, a mobile device number, a mobile device identification, and a card validity from a token provider computer; determining, by token gateway computer, whether a token issuer is onboarded; validating, by the token gateway computer, the PAN information, a card expiry information, and a card postal code; transmitting, by the token gateway computer, a pending state token to the token provider computer upon completion of validation of the PAN information, the card expiry information, and the card postal code; receiving, by the token gateway computer, a push one-time password (OTP) value from the token provider computer; transmitting, by the token gateway computer, the push OTP value to an identity verifier to validate the push OTP; receiving, by the token gateway computer, approval of the token association of the mobile device; transmitting, by the token gateway computer, a token validated state message to the token provider computer and to the mobile device; receiving, by the token gateway computer, a validation from the identity verifier; and sharing, by the token gateway computer, a trusted public certificate to the mobile device for token challenge flows.

In another aspect, the method comprises determining, by the token gateway computer, a tokenization of card details with a token during a financial transaction.

In another aspect, the method comprises verifying an eligible mobile network provider for the mobile device number based on the card postal code.

In another aspect, the method comprises determining, by the token gateway computer, a mobile network provider based on the card postal code via the identity verifier.

In another aspect, the method comprises validating the PAN information, a card expiry information, and a card postal code via a core payment network system.

In another aspect, the method comprises checking, by the token gateway computer, with a payment network merchant services/issuer to determine whether a token issuer/provider is onboarded and eligible partners are available for the mobile device based on zip code.

In another aspect, the present disclosure provides a method of preventing fraud and authenticating users while processing a token on a mobile device. The method comprising enrolling, by a mobile device, a personal account number (PAN) information using a banking application running on the mobile device; transmitting, by the mobile device, the PAN information and a mobile device number to a token provider computer to create a token; receiving, by the mobile device, a pending state token to associate with the mobile device by the banking application; receiving, by the mobile device, a token linking a one-time password (OTP) value through a silent push notification from a mobile network provider through a mobile communication network; establishing communication, by the mobile device, with the token provider computer; receiving, by the mobile device, a token validated state message from a token gateway computer; requesting, by the mobile device, from the mobile network provider to associate the token to the mobile device by the banking application; and receiving, by the mobile device, a trusted public certificate from the mobile network provider through a mobile communication network.

In another aspect of the method, the banking application is an open banking application.

In another aspect, the method comprises receiving, by the mobile device, the token linking the OTP value through the silent push notification from the mobile network provider through the mobile communication network using a service provider international mobile equipment identity (IMEI) mapping.

In another aspect, the method comprises validating, by the token provider computer, the push OTP value by the banking application.

In another aspect, the method comprises sharing the trusted public certificate from the mobile network provider and the mobile device, approving the token, and allowing the token to be used for payments.

According to at least one aspect, the present disclosure provides a system for preventing fraud and authenticating users while processing a token on a token gateway server computer, a token provider server computer receives a personal account number (PAN) information and a mobile device number from a banking application running on a mobile device. The token provider server computer enrolls the PAN information and the mobile device number to create a token based on the PAN information and the mobile device number. The token provider server computer establishes communication with a token gateway server computer and shares the PAN information, the mobile device number, a mobile device identification, and card validity with the token gateway server computer to determine a tokenization of card details with the token during a financial transaction process. The token provider server computer receives a pending state token from the token gateway server computer upon completion of validation of the PAN, a card expiry information, and a card postal code. The token provider server computer transmits the pending state token to the banking application running on the mobile device to associate the pending state token with the mobile device. The token provider server computer receives a validation request from the banking application for a push one-time password (OTP) value. The token provider server computer transmits the push OTP to the token gateway server computer. The token provider server computer receives a token validated state message from the token gateway server computer.

In another aspect of the system, the banking application running on the mobile device is an open banking application.

In another aspect of the system, the token provider server computer shares the PAN information, the mobile device number, a mobile device identification, and card validity with the token gateway server computer.

In another aspect of the system, the token provider server computer transmits the token validated state message to the mobile device.

In another aspect of the system, a token is created on the mobile device based on the PAN information and the mobile device number on the mobile device.

In another aspect of the system, the token provider server computer receives a notification of a high risk transaction from the banking application and declines the token for the high risk transaction.

According to at least another aspect, the present disclosure provides a system for preventing fraud and authenticating users while processing a token on a token gateway server computer, a token gateway server computer receives a personal account number (PAN) information, a mobile device number, a mobile device identification, and a card validity from a token provider server computer to determine a tokenization of card details with a token while a financial transaction is in process. The token gateway server computer determines whether a token issuer is onboarded and verifies an eligible mobile network provider for the mobile device number based on the card postal code. The token gateway server computer determines validation of the PAN information, a card expiry information, and a card postal code via a core payment network system. The token gateway server computer transmits a pending state token to the token provider computer upon completion of validation of the PAN information, the card expiry information, and the card postal code. The token gateway server computer determines a mobile network provider based on the card postal code via an identity verifier. The token gateway server computer receives a push one-time password (OTP) value from the token provider computer. The token gateway server computer transmits the push OTP value to an identity verifier to validate the push OTP. The token gateway server computer receives approval of the token association of the mobile device. The token gateway server computer transmits a token validated state message to the token provider computer and to the mobile device. The token gateway server computer receives a validation from the identity verifier. The token gateway server computer shares a trusted public certificate to the mobile device for token challenge flows.

In another aspect of the system, the token gateway server computer determines a tokenization of card details with a token during a financial transaction.

In another aspect of the system, an eligible mobile network provider for the mobile device number is verified based on the card postal code.

In another aspect of the system the token gateway server computer determines a mobile network provider based on the card postal code via an identity verifier.

In another aspect of the system, the PAN information, a card expiry information, and a card postal code is validated via a core payment network system.

In another aspect of the system, the token gateway computer checks with a payment network merchant services/issuer to determine whether a token issuer/provider is onboarded and eligible partners are available for the mobile device based on zip code.

According to at least another aspect, the present disclosure provides a system for preventing fraud and authenticating users while processing a token on a mobile device, a mobile device enrolls a personal account number (PAN) information using a banking application running on the mobile device. The mobile device transmits the PAN information and a mobile device number to a token provider computer to create a token. The mobile device receives a pending state token to associate with the mobile device by the banking application. The mobile device receives a token linking a one-time password (OTP) value through a silent push notification from a mobile network provider through a mobile communication network. The mobile device establishes communication with the token provider server computer. The mobile device receives a token validated state message from a token gateway server computer. The mobile device requests from the mobile network provider to associate the token to the mobile device by the banking application. The mobile device receives a shared trusted public certificate from the mobile network provider through the communication network.

In another aspect of the system, the banking application is an open banking application.

In another aspect of the system, the mobile device receives the token linking the OTP value through the silent push notification from the mobile network provider through the mobile communication network using a service provider international mobile equipment identity (IMEI) mapping.

In another aspect of the system, the token provider server computer validates the push OTP value by the banking application.

In another aspect of the system, the trusted public certificate from the mobile network provider and the mobile device is shared, the token is approved, and the token is allowed to be used for payments.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
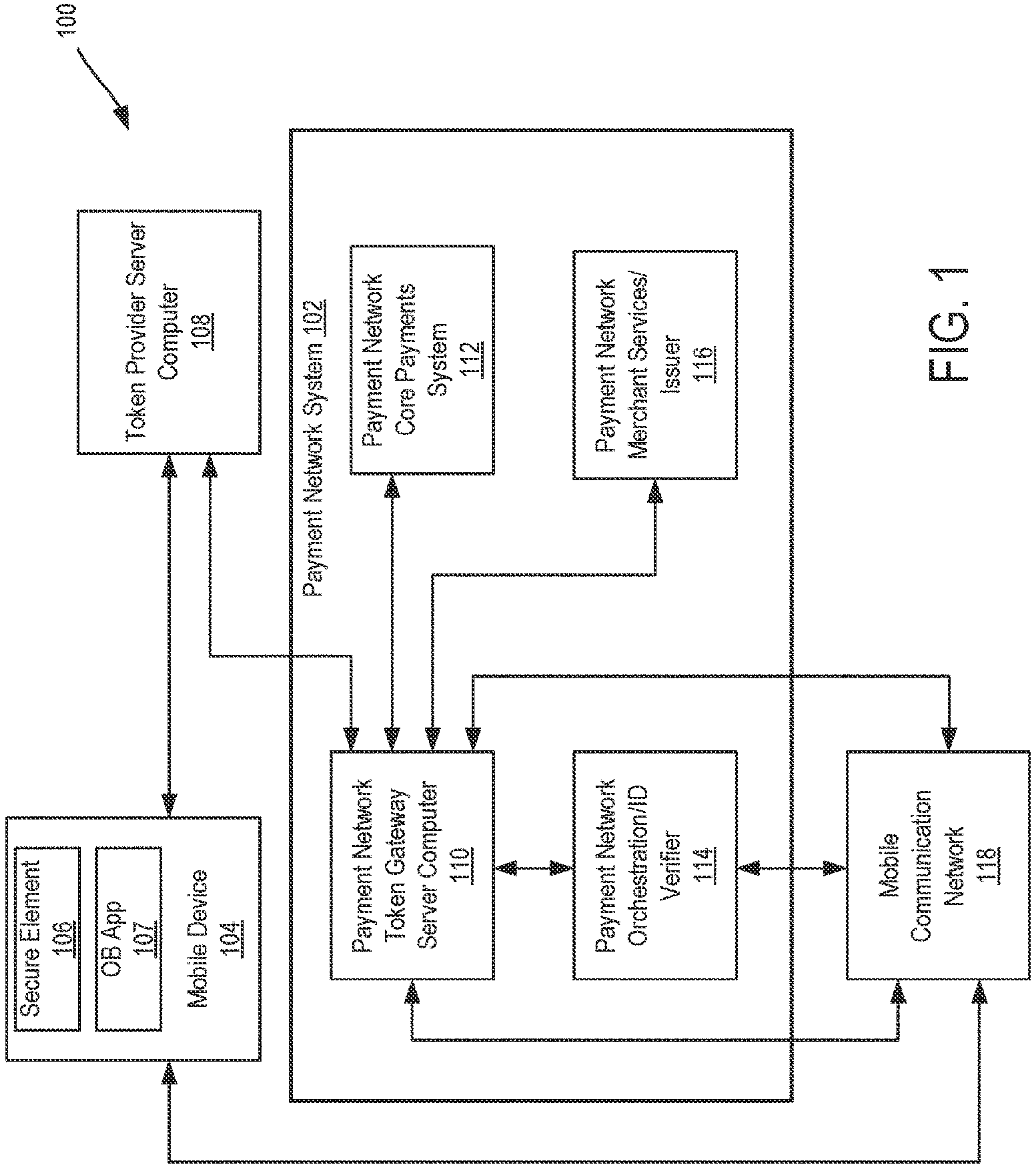

The systems and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a system for preventing fraud and authenticating users while processing a token on a token provider server computer, according to at least one aspect of the present disclosure.

Figure 2:
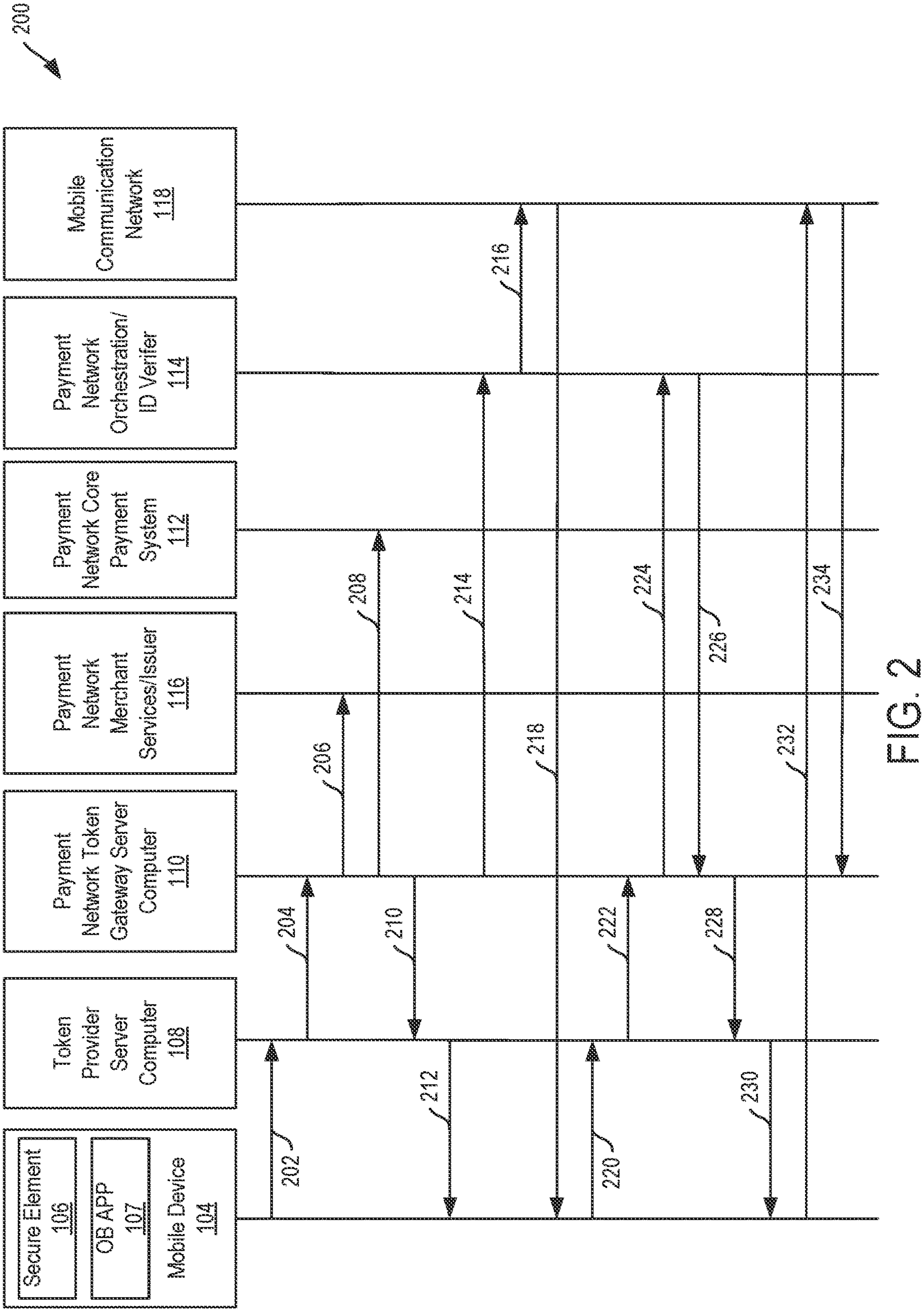

FIG. 2 is a swimlane diagram of a process for preventing fraud and authenticating users while processing a token on a token provider computer, according to at least one aspect of the present disclosure.

Figure 3:
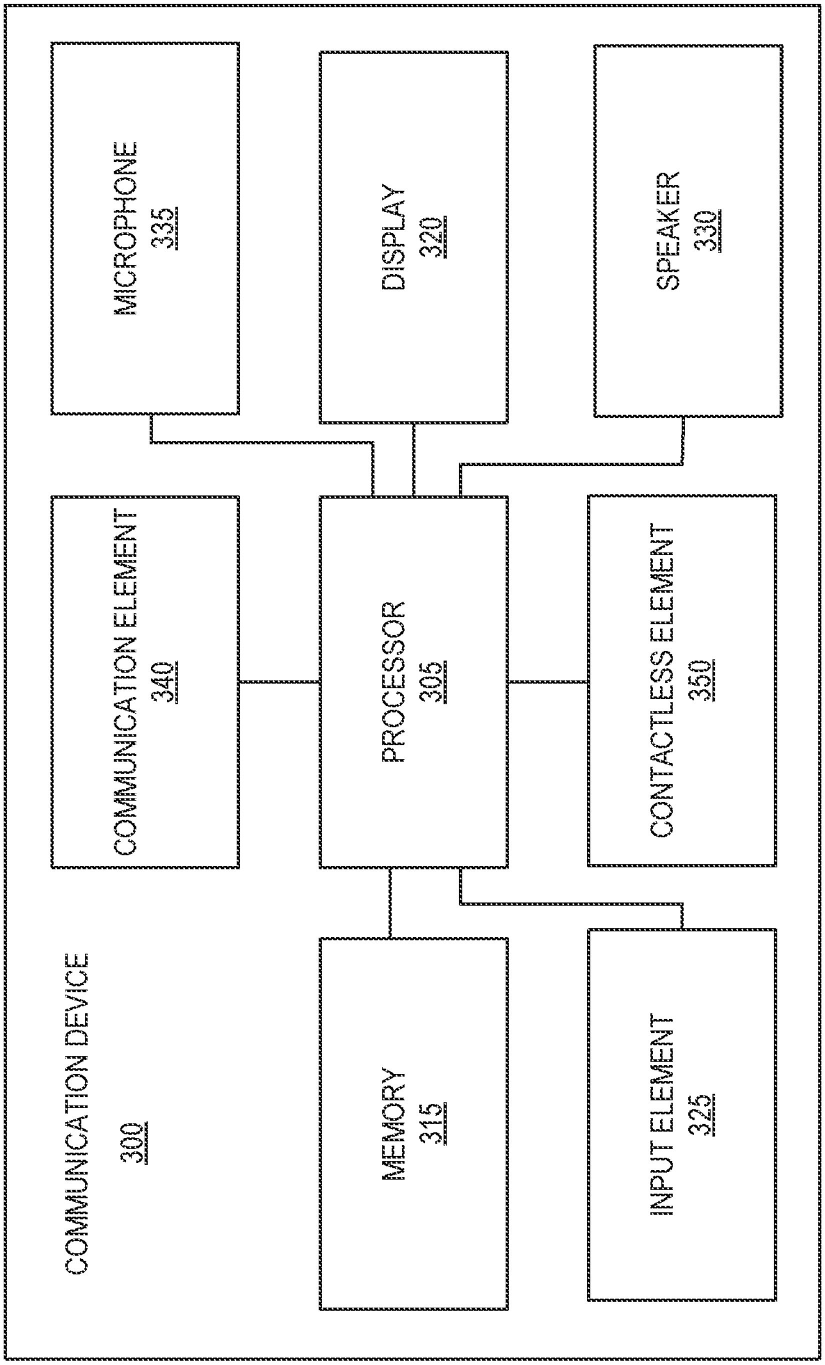

FIG. 3 illustrates a block diagram of a communication device that may be used in embodiments, according to at least one aspect of the present disclosure.

Figure 4:
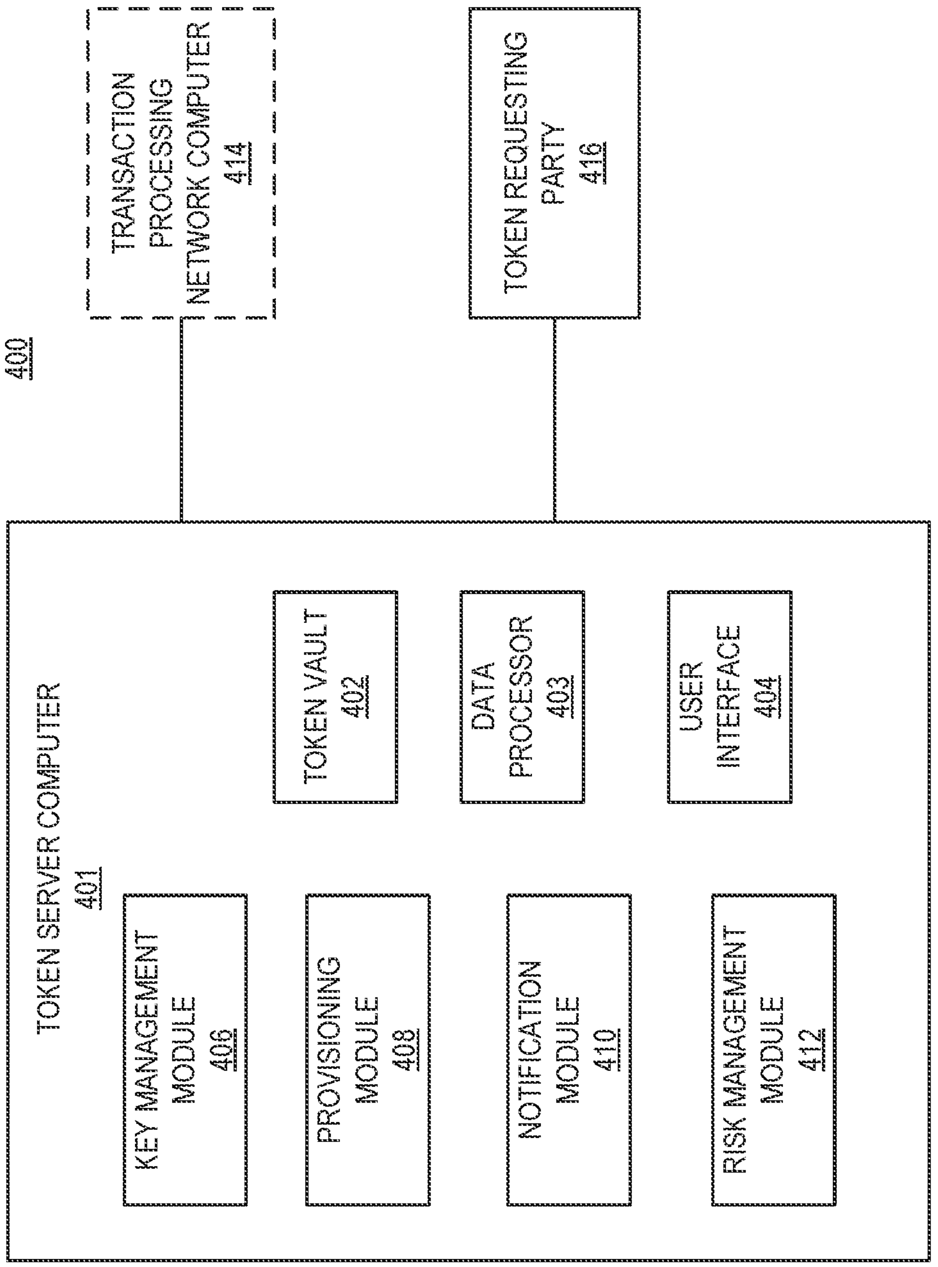

FIG. 4 illustrates a block diagram of a tokenization system including a token server computer, according to at least one aspect of the present disclosure.

Figure 5:
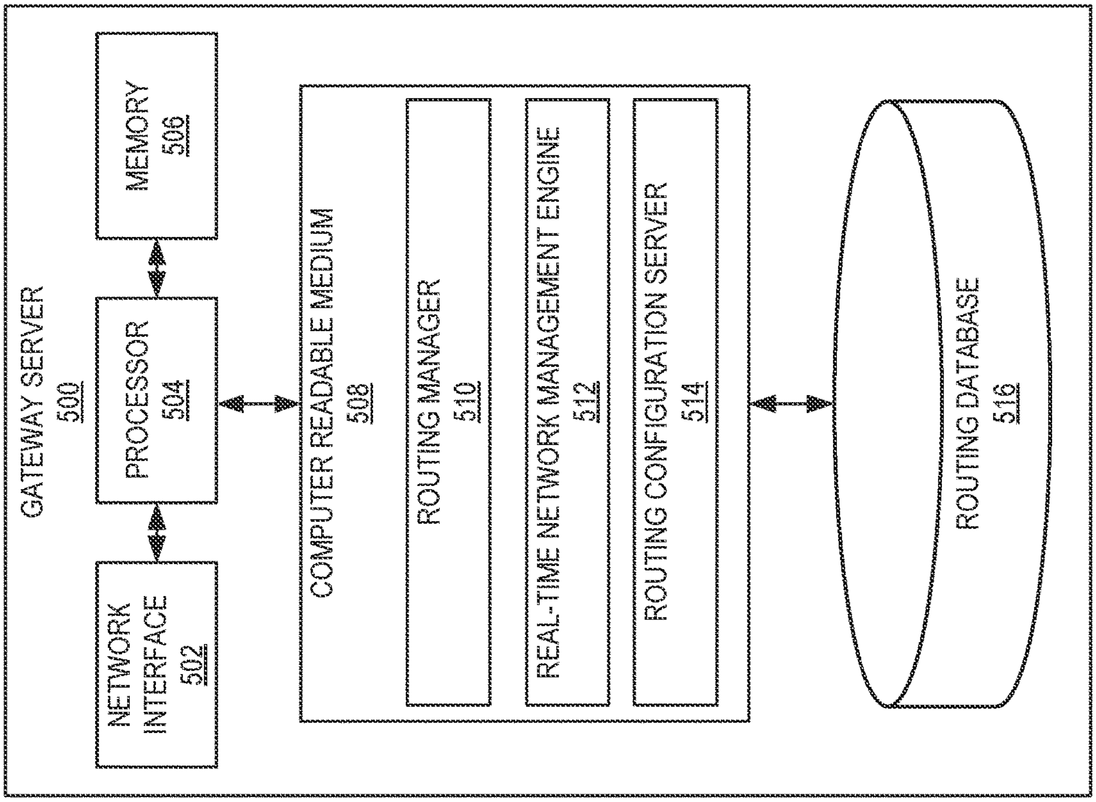

FIG. 5 illustrates a block diagram of a gateway server, according to at least one aspect of the present disclosure.

Figure 6:
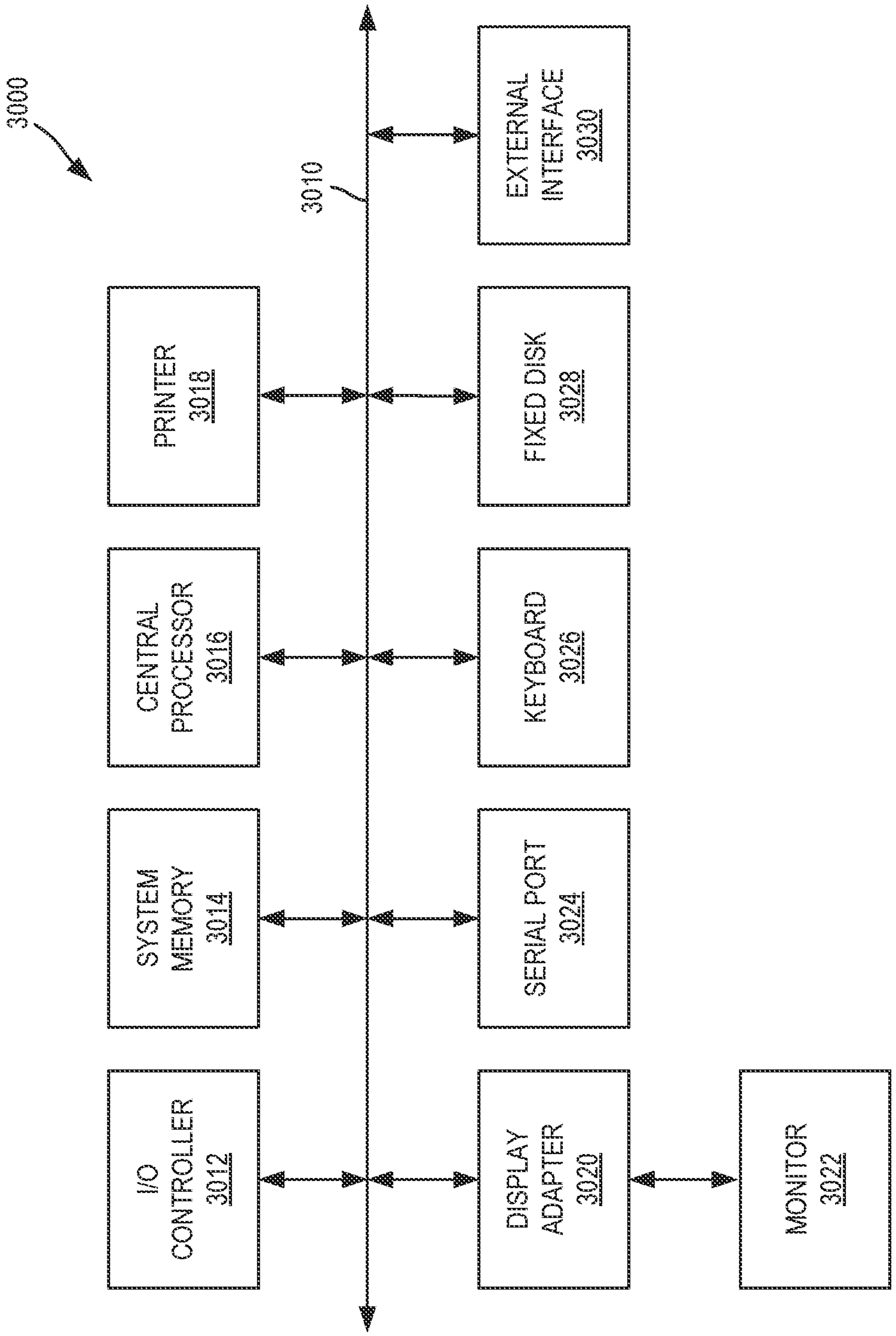

FIG. 6 illustrates a block diagram of a computer apparatus with data processing subsystems or components, according to at least one aspect of the present disclosure.

Figure 7:
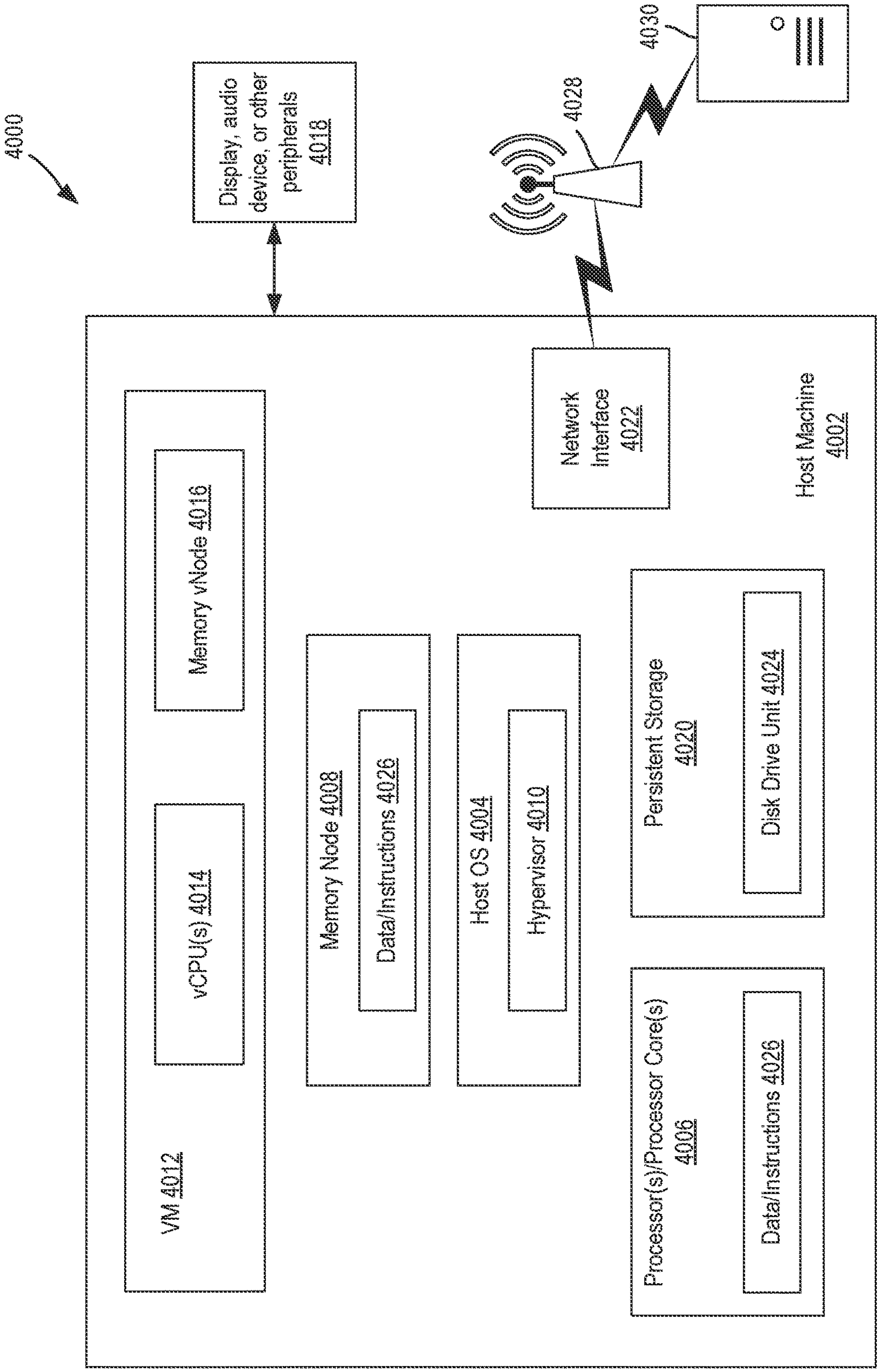

FIG. 7 is a diagrammatic representation of an example system that includes a host machine within which a set of instructions to perform any one or more of the methodologies discussed herein may be executed, according to at least one aspect of the present disclosure.

Figure 8:
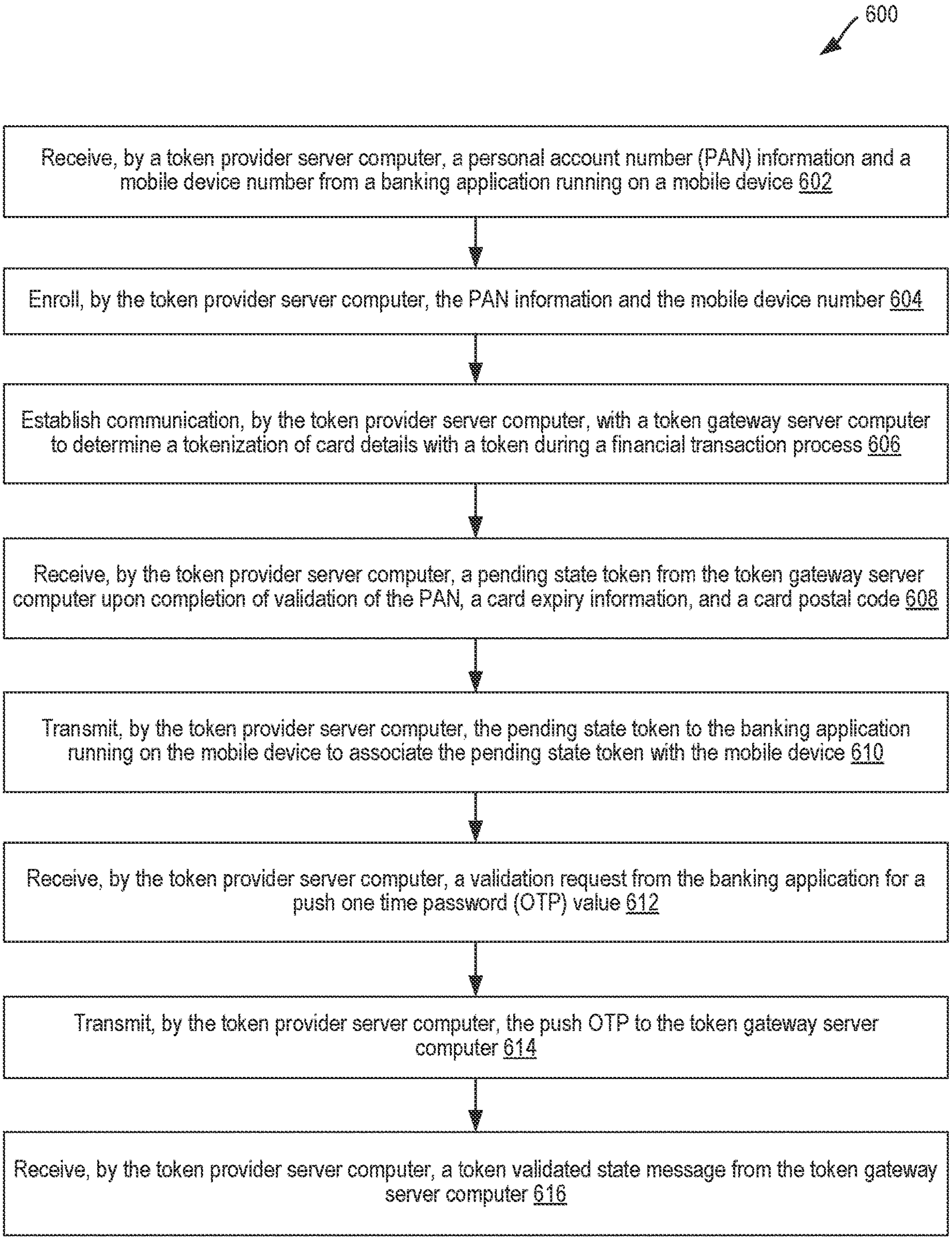

FIG. 8 is a logic flow diagram of a method of preventing fraud and authenticating users while processing a token on a token provider server computer, according to at least one aspect of the present disclosure.

Figure 9:
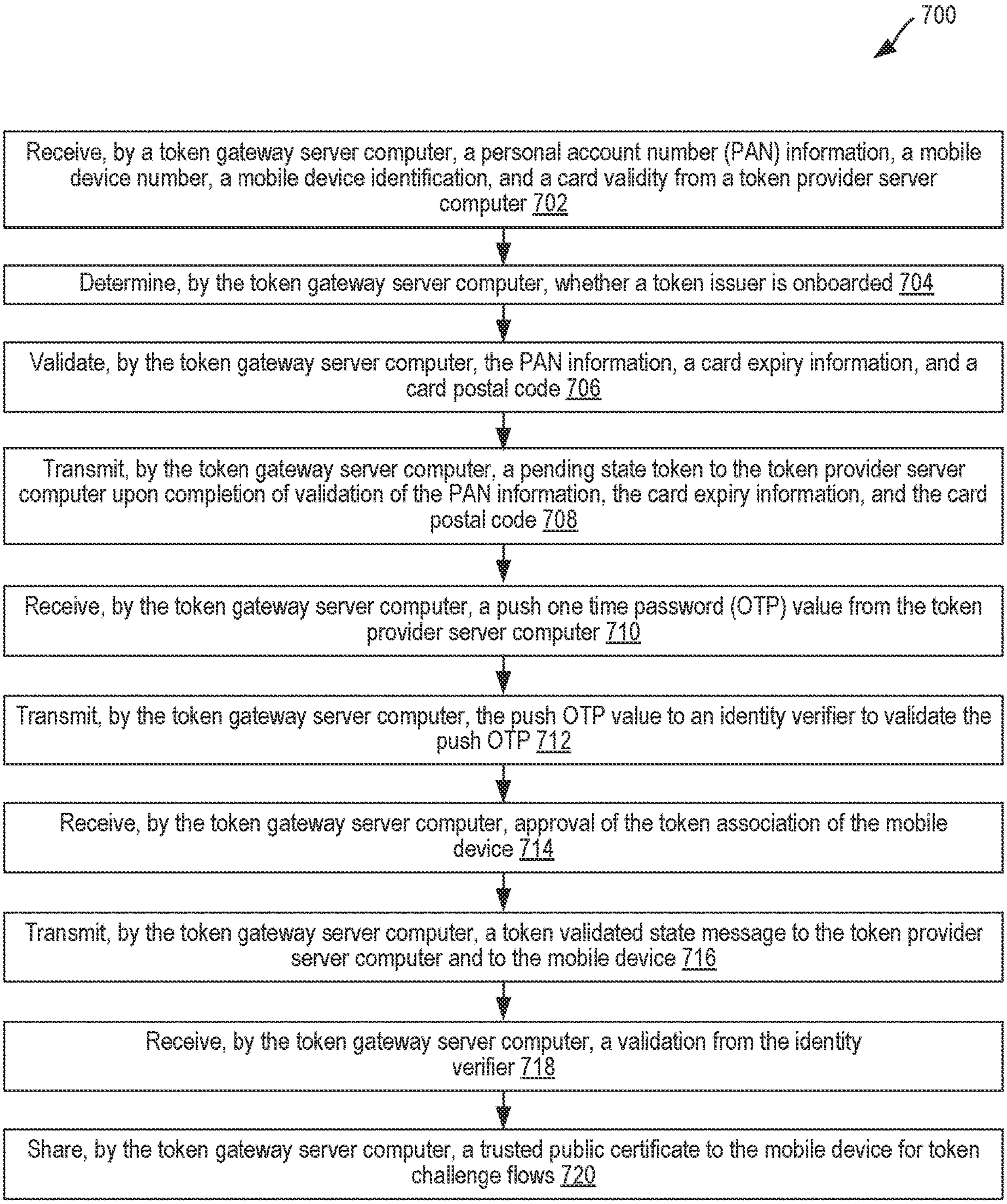

FIG. 9 is a logic flow diagram of a method of preventing fraud and authenticating users while processing a token on a token gateway server computer, according to at least one aspect of the present disclosure.

Figure 10:
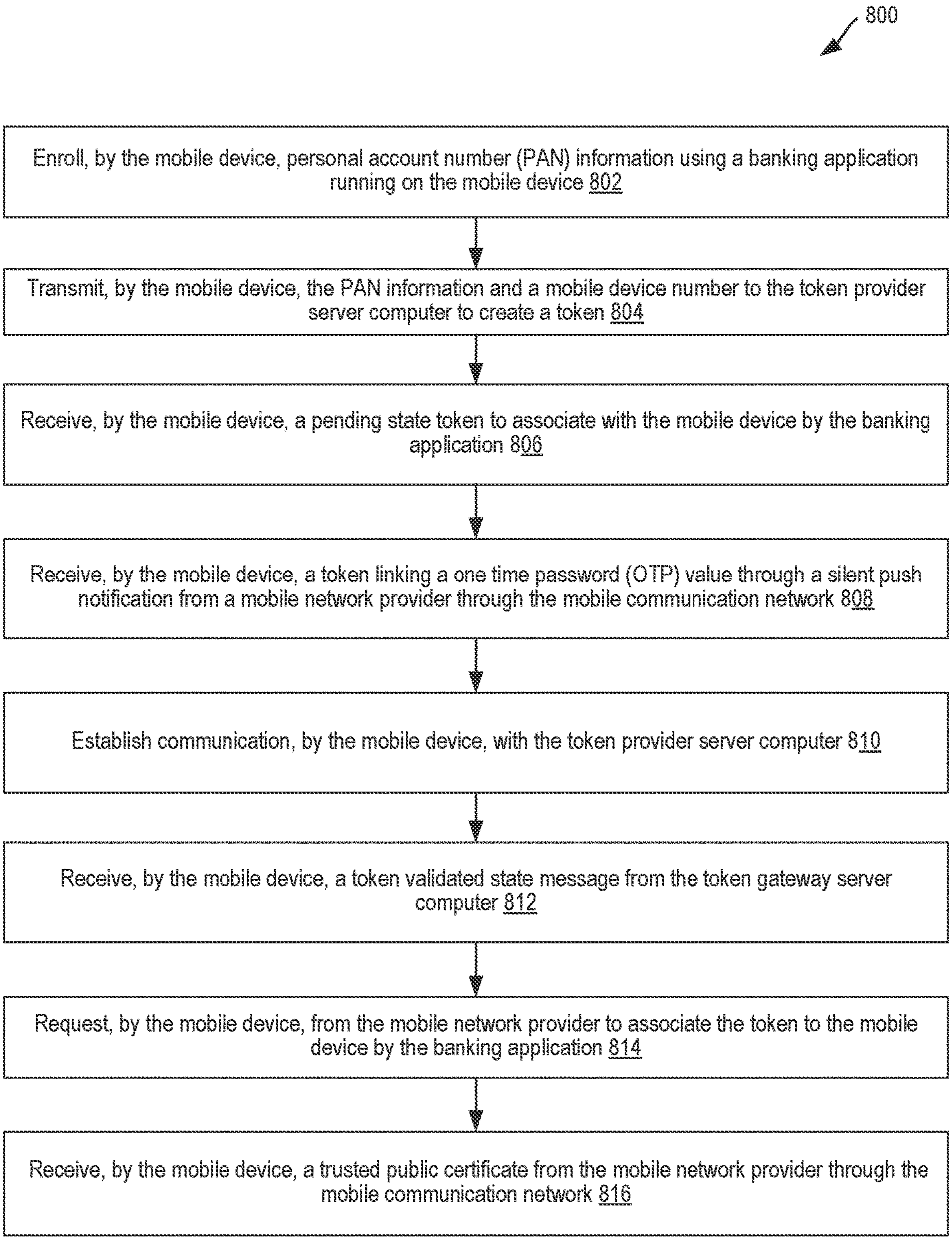

FIG. 10 is a logic flow diagram of a method of preventing fraud and authenticating users while processing a token on a mobile device, according to at least one aspect of the present disclosure.

DESCRIPTION

The following disclosure may provide exemplary systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

"Account credential," "account number," or "payment credential" may refer to any suitable information associated with an account and may include any information that identifies an account and allows a payment processor to verify that a device, person, or entity has permission to access the account (e.g., a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, a token (e.g., account identifier substitute), an expiration date, a cryptogram, personal information associated with an account (e.g., address, etc.), an account alias, or any combination thereof. Account credentials may be static or dynamic such that they change over time. Further, in some embodiments or aspects, the account credentials may include information that is both static and dynamic. Payment credentials may be any information that identifies or is associated with a payment account. Payment credentials may be provided in order to make a payment from a payment account. Payment credentials can also include a user name, an expiration date, a gift card number or code, and any other suitable information. An account identifier and expiration date may be static but a cryptogram may be dynamic and change for each transaction. Further, in some embodiments or aspects, some or all of the account credentials may be stored in a secure memory of a user device. The secure memory of the user device may be configured such that the data stored in the secure memory may not be directly accessible by outside applications and a payment application associated with the secure memory may be accessed to obtain the credentials stored on the secure memory. Accordingly, a mobile application may interface with a payment application in order to gain access to payment credentials stored on the secure memory.

"Account data" may refer to any data concerning one or more accounts for one or more users. Account data may include, for example, one or more account identifiers, user identifiers, transaction histories, balances, credit limits, issuer institution identifiers, and/or the like.

"Account identifier" may refer to one or more types of identifiers associated with an account (e.g., a unique identifier of an account, an account number, a PAN, a card number, a payment card number, a token, and/or the like) of a user. In some non-limiting embodiments or aspects, an issuer may provide an account identifier (e.g., a PAN, a token, a globally unique identifier (GUID), a universally unique identifier (UUID), and/or the like) to a user that uniquely identifies one or more accounts associated with that user. In some non-limiting embodiments or aspects, an account identifier may be embodied on a payment device (e.g., a portable financial instrument, a payment card, a credit card, a debit card, and/or the like) and/or may be electronic information communicated to the user that the user may use for electronic payment transactions. In some non-limiting embodiments or aspects, an account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten by the user, stolen from the user, and/or the like, a supplemental account identifier may be provided to the user. In some non-limiting embodiments or aspects, an account identifier may be directly or indirectly associated with an issuer such that an account identifier may be a token that maps to a PAN or other type of identifier. Account identifiers may be alphanumeric, any combination of characters and/or symbols, and/or the like.

"Account token" may refer to an identifier that is used as a substitute or replacement identifier for an account identifier, such as a PAN. An account token may be used as a substitute or replacement identifier for an original account identifier, such as a PAN. Account tokens may be associated with a PAN or other original account identifier in one or more data structures (e.g., one or more databases and/or the like) such that they may be used to conduct a transaction without directly using the original account identifier. In some non-limiting embodiments or aspects, an original account identifier, such as a PAN, may be associated with a plurality of account tokens for different individuals or purposes. In some non-limiting embodiments aspects, account tokens may be associated with a PAN or other account identifiers in one or more data structures such that they can be used to conduct a transaction without directly using the account identifier, such as a PAN. In some examples, an account identifier, such as a PAN, may be associated with a plurality of account tokens for different uses or different purposes.

"Acquirer" may refer to an entity licensed by the transaction service provider and/or approved by the transaction service provider to originate transactions (e.g., payment transactions) using a portable financial device associated with the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor. An "acquirer" typically is a business entity (e.g., a commercial bank) that has a business relationship with a particular merchant or other entity. Some entities can perform both issuer and acquirer functions. Some embodiments or aspects may encompass such single entity issuer-acquirers. An acquirer may operate an acquirer computer, which can also be generically referred to as a "transport computer".

"Acquirer system" may refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitator, and/or the like. In some non-limiting embodiments or aspects, an acquirer may be a financial institution, such as a bank.

"Application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application. Further, an "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

"Authentication" is a process by which the credential of an endpoint (including but not limited to applications, people, devices, process, and systems) can be verified to ensure that the endpoint is who they are declared to be.

"Client device" and "user device" may refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

"Communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

"Communication channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instances comprise a "secure communication channel" or a "tunnel," either of which may be established in any known manner, including the use of mutual authentication and a session key and establishment of a secure communications session. However, any method of creating a secure communication channel may be used, and communication channels may be wired or wireless, as well as long-range, short-range, or medium-range. By establishing a secure channel, sensitive information related to a payment device (such as account number, CVV values, expiration dates, etc.) may be securely transmitted between the two entities to facilitate a transaction.

"Comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

"Computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

"Consumer" may include an individual or a user that may be associated with one or more personal accounts and/or consumer devices. The consumer may also be referred to as a cardholder, account holder, or user.

"Credential" may be any suitable information that serves as reliable evidence of worth, ownership, identity, or authority. A credential may be a string of numbers, letters, or any other suitable characters that may be present or contained in any object or document that can serve as confirmation. Examples of credentials include value credentials, identification cards, certified documents, access cards, passcodes and other login information, etc.

"Device," "server," "processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function. See "server" and "server computer" below.

"Gateway processing service" may refer to a service that enables transaction processing via multiple payment processing networks through a single connection to the gateway processing service. The gateway processing service may include one or more servers, data processing subsystems, networks, and operations used to deliver authorization services, exception file services, and clearing and settlement services. An authorization request message received by the gateway processing service may be routed to one of a plurality of payment processing networks according to a routing priority list. The gateway processing service may assess network connectivity of payment processing networks and may use this information in the routing of authorization request messages.

"Interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some embodiments or aspects, an interface may include an application programming interface (API) or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

"Issuer" can include a payment account issuer. The payment account (which may be associated with one or more payment devices) may refer to any suitable payment account (e.g. credit card account, a checking account, a savings account, a merchant account assigned to a consumer, or a prepaid account), an employment account, an identification account, an enrollment account (e.g. a student account), etc.

"Issuer institution," "portable financial device issuer," "issuer," or "issuer bank" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions), such as initiating credit and/or debit payments. For example, an issuer may provide an account identifier, such as a personal account number (PAN), to a user that uniquely identifies one or more accounts associated with the user. The account identifier may be used by the user to conduct a payment transaction. The account identifier may be embodied on a portable financial device, such as a physical financial instrument, e.g., a payment card, and/or may be electronic and used for electronic payments. In some non-limiting embodiments or aspects, an issuer may be associated with a bank identification number (BIN) that uniquely identifies the issuer. As used herein "issuer system" or "issuer institution system" may refer to one or more systems operated by or operated on behalf of an issuer. For example, an issuer system may refer to a server executing one or more software applications associated with the issuer. In some non-limiting embodiments or aspects, an issuer system may include one or more servers (e.g., one or more authorization servers) for authorizing a payment transaction.

"Merchant" may refer to one or more individuals or entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein "merchant system" may refer to one or more computer systems operated by or on behalf of a merchant, such as a server computer executing one or more software applications.

"Merchant application" may include any application associated with a relying party to a transaction. For example, a merchant mobile application may be associated with a particular merchant or may be associated with a number of different merchants. In some embodiments or aspects, the merchant mobile application may store information identifying a particular merchant server computer that is configured to provide a sales environment in which the merchant server computer is capable of processing remote transactions initiated by the merchant application. Further, the merchant mobile application may also include a general purpose browser or other software designed to interact with one or more merchant server computers. In some cases, the merchant mobile application may be installed in the general purpose memory of a user device and thus, may be susceptible to malicious attacks.

"Mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—e.g., using the other device as a modem-both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

"Payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

"Payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

"Payment processing network" may refer to a system that receives accumulated transaction information from the gateway processing service, typically at a fixed time each day, and performs a settlement process. Settlement may involve posting the transactions to the accounts associated with the payment devices used for the transactions and calculating the net debit or credit position of each user of the payment devices. An exemplary payment processing network is Interlink®.

"Payment token issuer identifier" may include any series of characters, numbers, or other identifiers that may be used to identify an issuer associated with a payment token. For example, a payment token issuer identifier may include a token BIN that identifies a particular issuer associated with an account identified using the token. In some embodiments or aspects, a payment token issuer identifier may be mapped to a real issuer identifier (e.g., a BIN) for an issuer. For example, a payment token issuer identifier may include a six digit numerical value that may be associated with an issuer. For instance, any token including the payment token issuer identifier may be associated with a particular issuer. As such, the issuer may be identified using the corresponding issuer identifier range associated with the token issuer identifier. For example, a payment token issuer identifier “490000” corresponding to a payment token “4900 0000 0000 0001” can be mapped to an issuer identifier “414709” corresponding to a payment account identifier “4147 0900 0000 1234.” In some embodiments or aspects, a payment token issuer identifier is static for an issuer. For example, a payment token issuer identifier (e.g., “490000”) may correspond to a first issuer and another payment token issuer identifier (e.g., “520000”) may correspond to a second issuer, and the first and second payment token issuer identifiers may not be changed or altered without informing all entities within the network token processing system. In some embodiments or aspects, a payment token issuer identifier range may correspond to an issuer identifier. For example, payment tokens including payment token issuer identifiers from “490000”-“490002” may correspond to a first issuer (e.g., mapped to issuer identifier “414709”) and payment tokens including payment token issuer identifiers from “520000”-“520002” may correspond to a second issuer (e.g., mapped to real issuer identifier “417548”).

“Primary account number (PAN)” may be a variable length, (e.g. 13 to 19-digit) industry standard-compliant account number that is generated within account ranges associated with a BIN by an issuer.

“Processing network” may include an electronic system used to accept, transmit, or process transactions made by devices. The processing network may transfer information among transacting parties (e.g., issuers, acquirers, merchants, device users, etc.).

“Provisioning” may include a process of providing data for use. For example, provisioning may include providing, delivering, or enabling a token on a device. Provisioning may be completed by any entity within or external to the transaction processing system. For example, in some embodiments or aspects, tokens may be provisioned by an issuer or a payment processing network onto a mobile device of a consumer (e.g. account holder). The provisioned tokens may have corresponding token data stored and maintained in the token vault or token registry. In some embodiments or aspects, a token vault or token registry may generate a token that may then be provisioned or delivered to a device. In some embodiments or aspects, an issuer may specify a token range from which token generation and provisioning can occur. Further, in some embodiments or aspects, an issuer may generate and notify a token vault of a token value and provide the token record information (e.g., token attributes) for storage in the token vault.

“Requested token assurance level” may refer to the token assurance level requested from the token service provider by the token requestor. The requested token assurance level may be included in a field of a token request message send by the requestor to the token service provider for the generation/issuance of the token.

“Requestor” may be an entity that can request an item or action. A requestor may be an application, a device, or a system that is configured to perform actions associated with tokens. For example, a requestor can request registration with a network token system, request token generation, token activation. token de-activation, token exchange, other token life-cycle management related processes, and/or any other token related processes. A requestor may interface with a network token system through any suitable communication networks and/or protocols (e.g., using HTTPS, simple object access protocol (SOAP) and/or an extensible markup language (XML) interface). Some non-limiting examples of a requestor may include third party wallet providers, issuers, acquirers, merchants, and/or payment processing networks. A requestor may be referred to as a “token requestor” when requesting generation of a new token or requesting a new use of an existing token from a network token system. In some embodiments or aspects, a token requestor can request tokens for multiple domains and/or channels. Some non-limiting examples of token requestors may include, for example, card-on-file merchants, acquirers, acquirer processors, and payment gateways acting on behalf of merchants, payment enablers (e.g., original equipment manufacturers, mobile network operators, etc.), digital wallet providers, issuers, third party wallet providers, and/or payment processing networks. A token requestor may refer to an entity that is seeking to implement tokenization according to embodiments or aspects of the present disclosure. The token requestor may initiate a request that a primary account number (PAN) be tokenized by submitting a token request message to the token service provider. According to various embodiments or aspects discussed herein, a token requestor may no longer need to store a PAN associated with a token once the requestor have received the token in response to a token request message. A token requestor may be registered and identified uniquely by the token service provider within the tokenization ecosystem. During token requestor registration, the token service provider may formally process token requestor’s application to participate in the token service system. The token service provider may collect information pertaining to the nature of the requestor and relevant use of tokens to validate and formally approve the token requestor and establish appropriate domain restriction controls. Successfully registered token requestors may be assigned a token requestor identifier that may also be entered and maintained within the token vault. Token requestors be revoked or assigned new token requestor identifiers. This information may be subject to reporting and audit by the token service provider.

“Server” may include one or more computing devices which can be individual, stand-alone machines located at the same or different locations, may be owned or operated by the same or different entities, and may further be one or more clusters of distributed computers or “virtual” machines housed within a datacenter. It should be understood and appreciated by a person of skill in the art that functions performed by one “server” can be spread across multiple disparate computing devices for various reasons. As used herein, a “server” is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term “server” may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a “system,” such as a merchant’s point-of-sale system. Reference to “a server” or “a processor,” as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

"Server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

"System" may refer to one or more computing devices or combinations of computing devices (e.g., processors, servers, client devices, software applications, components of such, and/or the like).

"Token" or "payment token" may include an identifier for a payment account that is a substitute for an account identifier, such as a primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments or aspects, a token may be "format preserving" and may have a numeric format that conforms to the account identifiers used in existing payment processing networks (e.g., ISO 8583 financial transaction message format). In some embodiments or aspects, a token may be used in place of a PAN to initiate, authorize, settle or resolve a payment transaction or represent the original credential in other systems where the original credential would typically be provided. In some embodiments or aspects, a token value may be generated such that the recovery of the original PAN or other account identifier from the token value may not be computationally derived. For example, a token may have a random association with a particular real PAN so that the real PAN is not computationally derivable from the token. A lookup table may be used to associate a real PAN and a corresponding random token. Further, in some embodiments or aspects, the token format may be configured to allow the entity receiving the token to identify it as a token and recognize the entity that issued the token.

According to various embodiments or aspects, a token may be associated with a token status. The token status may indicate, for example, that the token is a high quality token or a low quality token. The status of the token may be indicative of a level of restriction associated with the token. For example, no restrictions may be imposed on a high quality token whereas restrictions such as further identification requirements may be imposed on a low quality token. The status of the token may be based at least in part on the confidence level with which the token is generated.

In some embodiments or aspects, tokens may be device-specific such that each device associated with an account may be provisioned with a particular token. As such, if a transaction uses a token that is initiated by a different device than the device that the token was provisioned into, the transaction may be fraudulent. Accordingly, device information may be stored in the token vault and used to ensure that the device used in a transaction is associated with the token that is being used in the transaction. Additionally, because each token may be associated with a single device, one PAN or account may have multiple tokens associated with it, where each PAN may have a different token for the different devices that may be used to initiate a transaction associated with the PAN using a specific token. This provides additional security for transactions because network token systems have additional information to validate in order to control the use of sensitive information in a transaction processing system. A number of tokens can include a number of dynamic tokens that can be requested for the same account identifier (e.g., PAN) and/or same device at one-time. In some embodiments or aspects, the number of tokens can be optionally provided to the token requestor at the time of a token generation request. In some embodiments or aspects, tokens may be provided with overlapping time to live (TTL) so that one or more tokens may be active at any given time.

In some embodiments or aspects, the token format may allow entities in the payment system to identify the issuer associated with the token. For example, the format of the token may include a token issuer identifier that allows an entity (e.g., the payment processing network) to identify an issuer of the token. For instance, the token issuer identifier may be associated with an issuer's BIN of the underlying PAN in order to support the existing payment flow. The token issuer identifier may be a different number than the issuer's BIN and may be static. For example, if the issuer's BIN for an issuer is 412345, the token issuer identifier may be a token BIN of 428325 and this number may be static for all tokens issued from or for that issuer. In some embodiments or aspects, the token issuer identifier range (e.g., issuer token BIN range) may have the same attributes as the associated issuer card range and can be included in an issuer identifier routing table (e.g., BIN routing table). The issuer identifier routing table may be provided to the relevant entities in the payment system (e.g., merchants and acquirers).

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other-information which may be replaced with a substitute value (e.g., token, a credit card verification value (CVV)). Tokenization may be used to enhance transaction efficiency, improve transaction security, increase service transparency, or to provide a method for third-party enablement.

"Token attributes" may include any feature or information about a token. For example, token attributes may include information that can determine how a token can be used, delivered, issued, or otherwise how data may be manipulated within a transaction system. For example, token attributes may determine how a token may be used in place of a real account identifier (e.g., PAN) for a transaction. For example, the token attributes may include a type of token, frequency of use, token expiry date and/or expiry time, a number of associated tokens, a transaction lifecycle expiry date, and any additional information that may be relevant to any entity within a tokenization ecosystem. For example, token attributes may include a wallet identifier associated with the token, an additional account alias or other user account identifier (e.g., an email address, username, etc.), a device identifier, an invoice number, etc. In some embodiments or aspects, a token requestor may provide token attributes at the time of requesting the generation of tokens. In some embodiments or aspects, a network token system, payment network associated with the network token system, an issuer, or any other entity associated with the token may determine and/or provide the token attributes associated with a particular token.

The token attributes may identify a type of token indicating how the token may be used. For example, a type of token may be "payment" or "non-payment" to identify the token as being a payment token or a non-payment token. A payment token may include a high value token that can be used in place of a real account identifier (e.g., PAN) to generate original and/or subsequent transactions for a consumer account and/or card.

Another token type may be a "static" or "dynamic" token type for static and dynamic tokens, respectively. For example, a static token may include a token that may be issued by a payment processing network or issuer that may be issued in place of an account identifier (e.g., PAN) and may be used for the duration of the underlying account identifier (e.g., PAN). As such, static tokens may be used to submit any number of transactions and may not change for each transaction. Static tokens may be securely stored on the consumer device (e.g., stored in a secure memory or secure element of a mobile device) or in the cloud by the token requestor and may be delivered securely to a mobile device. However, static tokens may include sensitive information that may be protected as they may be used to perform multiple transactions over long periods of time.

Alternatively, dynamic tokens can include tokens that are limited or restricted in use (e.g., limited by time, amount threshold (aggregated amount or single-transaction amount), or by number of uses). As such, dynamic tokens can be generated and delivered on a per-transaction or on an as needed basis to the end user to initiate a payment transaction through a registered and authenticated device and/or channel. For example, a one-time use dynamic token can be used at electronic-commerce (e-commerce) websites and if the dynamic token is intercepted by a third party, the dynamic token may be useless because it has been used and is thus worthless for future transactions.

Non-payment tokens may include tokens which are not substitutes for real account identifiers (e.g., PANs). For example, non-payment tokens may be used by merchant/acquirer systems for analytics, offers, customer support, marketing, etc. However, non-payment tokens may not be used to generate original and subsequent transactions using real account identifiers (e.g., PANs) or other account identifiers. Accordingly, non-payment tokens may include low value tokens that may be used for non-payment transactions or transaction services by an entity within the transaction processing system.

"Token BIN" may refer to a specific BIN that has been designated only for the purpose of issuing tokens and may be flagged accordingly in BIN tables. Token BINs may not have a dual purpose and may not be used to issue both primary account numbers (PANs) and tokens.

"Token domain" may indicate the factors that can be established at the time of token issuance to enable appropriate usage of the token for payment transactions. A token domain may indicate an area and/or circumstance in which a token can be used. Examples of the token domain may include, but are not limited to, payment channels (e.g., e-commerce, physical point of sale, etc.), a POS entry modes (e.g., contactless, magnetic stripe, etc.), and merchant identifiers to uniquely identify where the token can be used. A set of parameters (e.g., token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments or aspects, the token domain restriction controls may restrict the use of the token at a particular merchant that can be uniquely identified. Some exemplary token domain restriction controls may require the verification of the presence of a token cryptogram that is unique to a given transaction. In some embodiments or aspects, a token domain can be associated with a token requestor.

"Token exchange" or "de-tokenization" is a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments or aspects, token exchange may be achieved via a transactional message, such as an ISO message, an application programming interface (API), or another type of web interface (e.g., web request).

"Token expiry date" may refer to the expiration date/time of the token that is generated by the token service provider and maintained in the token vault. The token expiry date may be passed among the entities of the tokenization ecosystem during transaction processing to ensure interoperability and minimize the impact of tokenization implementation. The token expiration date may be a numeric value (e.g. a 4-digit numeric value) that is consistent with the industry standards. In some embodiments or aspects, the token expiry date can be expressed as a time duration as measured from the time of issuance. A token expiration date and/or expiration time can determine a duration (e.g., days/hours/minutes) for which a token is valid. In some embodiments or aspects, a token expiration date may match the underlying account identifier's (e.g., PAN's) expiration date. In some embodiments or aspects, token expiration date may be defined as less than the associated real account identifier's (e.g., PAN's) expiration date. If a transaction is initiated after a token's expiration date, the token can be deemed as invalid and the transaction initiated with the corresponding token can be declined.

A life-cycle expiration date may include a time or date where the network token system may recycle or reuse a previously issued token. For example, the life-cycle expiration date may be maintained by the network token system for the entire life-cycle of a token once a token has been used for a transaction. This can allow various entities to submit subsequent transactions (or other service requests) with the token for a set period. Once this period is expired, the expired token can be recycled for re-use.

"Token interoperability" may refer to a process to ensure that the processing and exchanging of transactions between parties through existing interoperable capabilities is preserved when using tokens with new data fields and data field values that are defined in embodiments or aspects of the present disclosure.

"Token issuer identifier range (issuer BIN range)" may refer to a unique identifier (e.g., of 6 to 12 digits length) originating from a set of pre-allocated token issuer identifiers (e.g., 6 digit token BINs). For example, in some embodiments or aspects, one or more token BIN ranges can be allocated to each issuer BIN range that is associated with an issuer. In some embodiments or aspects, the token BIN ranges may be used to generate a payment token and may not be used to generate a non-payment token. As such, the non-payment tokens may comprise different token issuer identifiers or may not comprise token issuer identifiers. In some embodiments or aspects, a token may pass the basic validation rules of an account number including, for example, a LUHN check or checksum validation that may be set up by different entities within the payment system. In some embodiments or aspects, a payment token issuer identifier may be mapped to a real issuer identifier (e.g., a BIN) for an issuer. For example, a payment token issuer identifier may include a six digit numerical value that may be associated with an issuer. For instance, any token including the payment token issuer identifier may be associated with a particular issuer. As such, the issuer may be identified using the corresponding issuer identifier range associated with the token issuer identifier. For example, a payment token issuer identifier "540000" corresponding to a payment token "5400 0000 0000 0001" can be mapped to an issuer identifier "553141" corresponding to a payment account identifier "553141 0900 0000 1234". In some embodiments or aspects, a payment token issuer identifier is static for an issuer. For example, a payment token issuer identifier (e.g., "540000") may correspond to a first issuer and another payment token issuer identifier (e.g., "550000") may correspond to a second issuer, and the first and second payment token issuer identifiers may not be changed or altered without informing all entities within the network token processing system. In some embodiments or aspects, a payment token issuer identifier range may correspond to an issuer identifier. For example, payment tokens including payment token issuer identifiers from "490000"-"490002" may correspond to a first issuer (e.g., mapped to issuer identifier "414709") and payment tokens including payment token issuer identifiers from "520000"-"520002" may correspond to a second issuer (e.g., mapped to real issuer identifier "517548"). Token BIN Ranges and assignment of tokens from these BIN ranges may be made available to the parties accepting the transaction to make routing decisions.

"Token presentment mode" may indicate a method through which a token is submitted for a transaction. Some non-limiting examples of the token presentment mode may include machine readable codes (e.g., quick response code (QRC), barcode, etc.), mobile contactless modes (e.g., near-field communication (NFC) communication), e-commerce remote modes, e-commerce proximity modes, and any other suitable modes in which to submit a token. Tokens may be provided through any number of different methods. For example, in one implementation, a token may be embedded in machine-readable code which may be generated by a wallet provider, mobile application, or other application on mobile device and displayed on a display of the mobile device. The machine readable code can be scanned at the POS through which the token is passed to the merchant. A mobile contactless mode may include passing the token through NFC in a contactless message. An e-commerce remote mode may include submitting a token by a consumer or a wallet provider through an online transaction or as an e-commerce transaction using a merchant application or other mobile application. An e-commerce proximity mode may include submitting a token by a consumer from a wallet application on a mobile device at a merchant location.

The token presentment mode may include any identifier or method for indicating the mode through which a token is provided. For example, the token presentment mode may include a number associated with a particular type of transaction (e.g., 5 for NFC transaction, 3 for QR Code, etc.). Further, in some embodiments or aspects, the token presentment mode could be provided through a type of cryptogram or other dynamic data generated for a transaction. For example, each type of transaction presentment mode may have a different cryptogram algorithm associated with that type of presentment mode (e.g., NFC vs. QR Code), and the type of cryptogram used by be determined during validation of the cryptogram. Additionally, a token presentment mode may be provided by a mobile device or may be populated by a merchant access device (e.g., a POS terminal) or other entity within the transaction processing system (e.g., acquirer computer, merchant processor, etc.).

"Token Processing" may refer to transaction processing in which a token is present in lieu of the primary account number (PAN). The token is processed from the point of interaction throughout the network. The token processing further includes using the token vault for de-tokenization of the token in order to complete the transaction. Token processing may span payment processes that include authorization, capture, clearing, and exception processing.

"Token request message" may refer to an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments or aspects, a token request message may be formatted as an authorization request message (e.g., an ISO 8583 message format). In some embodiments or aspects, the token request message may have a zero dollar amount in an authorization amount field. As another example, the token request message may include a flag or other indicator specifying that the message is a token request message.

"Token request indicator" may refer to an indicator used to indicate that the message containing the indicator is related to a token request. The token request indicator may optionally be passed to the issuer as part of the Identification and Verification (ID&V) method to inform the issuer of the reason the account status check is being performed.

"Token requestor identifier (ID)" may include any characters, numerals, or other identifiers associated with an entity associated with a network token system. For example, a token requestor identifier may be associated with an entity that is registered with the network token system. In some embodiments or aspects, a unique token requestor ID may be assigned for each domain for a token request associated with the same token requestor. As such, in some embodiments or aspects, if a token requestor may request tokens for multiple domains, the token requestor may have multiple token requestor identifiers, one for each domain. For example, a token requestor ID can identify a pairing of a token requestor (e.g., a mobile device, a mobile wallet provider, etc.) with a token domain (e.g., e-commerce, contactless, etc.). A token requestor ID may include any format or type of information. For example, in one embodiment or aspect, the token requestor ID may include an alphanumerical value such as a ten digit or an eleven digit letter and/or number (e.g., 4678012345). In some embodiments or aspects, a token requestor ID may include a code for a token service provider (e.g., first 3 digits) such as the network token system and the remaining digits may be assigned by the token service provider for each requesting entity (e.g., mobile wallet provider) and the token domain (e.g., contactless, e-commerce, etc.).

In some embodiments or aspects, a token requestor identifier may be used in a transaction during authorization processing. For example, a token requestor identifier may be passed through a transaction request message to validate that the entity that is initiating the transaction is the same as the entity that requested and manages the token. In some embodiments or aspects, an entity (e.g., digital or mobile wallet provider, merchant, merchant of record, payment enabler, etc.) can be assigned a token requestor identifier during an on-boarding or registration process. In some embodiments or aspects, an acquirer/acquirer processor/ payment enabler (e.g., payment service provider) may populate the token requestor identifier for each merchant, mobile wallet provider, consumer, etc. into the authorization message field prior to submitting the authorization request message to a payment processing network.

A "token response message" may be a message that responds to a token request. A token response message may include an indication that a token request was approved or denied. A token response message may also include a payment token, mobile device identification information (e.g., a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments or aspects, a token response message may be formatted as an authorization response message (e.g., an ISO 8583 message format). In some embodiments or aspects, the token response message may have a zero dollar amount in an authorization amount field. As another example, the token response message may include a flag or other indicator specifying that the message is a token response message.

"Token service provider" may refer to an entity including one or more server computers in a token service system that generates, processes and maintains tokens. The token service provider may include or be in communication with a token vault where the generated tokens are stored. Specifically, the token vault may maintain one-to-one mapping between a token and a primary account number (PAN) represented by the token. The token service provider may have the ability to set aside licensed BINs as token BINs to issue tokens for the PANs that may be submitted to the token service provider. Various entities of a tokenization ecosystem may assume the roles of the token service provider. For example, payment networks and issuers or their agents may become the token service provider by implementing the token services according to embodiments or aspects of the present disclosure. A token service provider may provide reports or data output to reporting tools regarding approved, pending, or declined token requests, including any assigned token requestor IDs. The token service provider may provide data output related to token-based transactions to reporting tools and applications and present the token and/or PAN as appropriate in the reporting output.

"Token service system" may refer to a system that facilitates requesting, generating and/or issuing tokens, as well as maintaining an established mapping of tokens to primary account numbers (PANs) in a repository (e.g., token vault). In some embodiments or aspects, the token service system may establish a token assurance level for a given token to indicate the confidence level of the token to PAN binding. The token service system may support token processing of payment transactions submitted using tokens by de-tokenizing the token to obtain the actual PAN. In various embodiments or aspects, the token service system may include a token requestor and a token service provider interacting with the token requestor. In some embodiments or aspects, a token service system may include a tokenization computer alone, or in combination with other computers such as a transaction processing network computer.

"Token vault" may refer to a repository that maintains established token-to-PAN mappings. According to various embodiments or aspects, the token vault may also maintain other attributes of the token requestor that may be determined at the time of registration and that may be used by the token service provider to apply domain restrictions or other controls during transaction processing. For example, the token vault may maintain one-to-one mapping between a token and an account identifying number represented by the token. The token vault may be a part of the token service system. In some embodiments or aspects, the token vault may be provided as a part of the token service provider. Alternatively, the token vault may be a remote repository accessible by the token service provider. Token vaults, due to the sensitive nature of the data mappings that are stored and managed in them, may be protected by strong underlying physical and logical security.

"User" may include an individual. In some embodiments or aspects, a user may be associated with one or more personal accounts and/or mobile devices. The user may also be referred to as a cardholder, account holder, or consumer.

"User device" may refer to an electronic device that may be transported and/or operated by a user. A user device may provide remote communication capabilities to a network. The user device may be configured to transmit and receive data or communications to and from other devices. In some embodiments or aspects, the user device may be portable. Examples of user devices may include mobile phones (e.g., smart phones, cellular phones, etc.), PDAS, portable media players, wearable electronic devices (e.g. smart watches, fitness bands, ankle bracelets, rings, earrings, etc.), electronic reader devices, and portable computing devices (e.g., laptops, netbooks, ultrabooks, etc.). Examples of user devices may also include automobiles with remote communication capabilities.

"User information" may include any information that is associated with a user. For example, the user information may include a device identifier of a device that the user owns or operates and/or account credentials of an account that the user holds. A device identifier may include a unique identifier assigned to a user device that can later be used to verify the user device. In some embodiments or aspects, the device identifier may include a device fingerprint. The device fingerprint may an aggregation of device attributes. The device fingerprint may be generated by a software development kit (SDK) provided on the user device using, for example, a unique identifier assigned by the operating system, an International Mobile Station Equipment Identity (IMEI) number, operating system (OS) version, plug-in version, and the like.

Having provided some descriptions of terms used herein, the disclosure now turns to a discussion of specific embodiments, aspects, or examples of systems and methods for preventing fraud and authenticating users while processing a token on a token provider computer, a token gateway computer, and a mobile device, according to various aspects of the present disclosure. As open banking (OB) evolves, one token requestor can be associated with multiple token service providers. If the token shared by the token requestor is being used when the risk scores are high (based on Amount+Device+Location+Merchant Category); the token issuer may want the option to re-challenge the token prior to initiating a payment. In one aspect, the mobile service provider (e.g., AT&T, Verizon, T-Mobile) can act as a trusted partner to send a silent push to the mobile device (using the phone number registered for the mobile device-IMEI). The "one-time" challenge code can thereby be sent to the mobile device and, based on user action, the token can be permitted for further transactions. Accordingly, fraud can be prevented for tokens with the assistance of the mobile service providers by tracking calls/registered device and close coupling of the mobile device phone number and mobile device ID.

Accordingly, in one general aspect, a third party token issuer may reach an agreement with the token requestor for using tokens based on the payment network system (e.g., Visa, MasterCard, American Express). The mobile service provider is enrolled on the payment network issuer platforms as a mobile identity partner. In one aspect, a user may want to initiate a payment using tokens while using a third party application (Token Service Provider). An artificial intelligence (AI) engine sends a risk score which implies a challenge score. A challenge is sent to the token issuer (e.g., Open Banking) for ID validation. ID validation data is shared by the token issuer by calling the mobile identity partner for the validation. The mobile identity partner sends a silent push to the mobile device and creates a one-time challenge (OTC) based on the shared certification with the payment network. The user enters the OTC to the mobile device and the mobile device is authenticated for payment.

The present disclosure is generally directed to systems and methods for preventing fraud and authenticating users while processing a token on a token provider server computer, according to at least one aspect of the present disclosure. The systems and methods according at least one aspect of the present disclosure enable open banking (OB) customers to have a token on a mobile device when the banking customer does not have a direct working issuer relationship with a payment network for creating tokens. It is well known that tokens need close association with the mobile device. Accordingly, a mobile communication network operated by a mobile service provider is a partner agent for close coupling tokens for authentication. The systems and methods according at least one aspect of the present disclosure prevent or minimize frauds that occur more frequently for one-time use tokens (delete and forget) since they can be closely coupled to mobile device.

Prerequisites for implementing the systems and methods according at least one aspect of the present disclosure include, for example, a small scale open bank application programming interface (API) integrator (e.g., SOFI), an issuer (e.g., Chase), and mobile service provider. The small scale open bank API integrator has an option to initiate tokens on their mobile device. The issuer is enrolled on the payment network to enable tokenization on the cards for third party financial institutions. The mobile service provider in United States, for example, and has an agreement to be a mobile device alignment trusted partner and is onboarded on the payment network as a mobile trusted partner.

Turning now to the figures, FIG. 1 illustrates a system 100 for preventing fraud and authenticating users while processing a token on a token provider server computer, according to at least one aspect of the present disclosure. The system 100 comprises a payment network system 102, a mobile device 104, a token provider server computer 108, and a mobile communication network 118. The payment network system 102 comprises a payment network token gateway server computer 110, a payment network core payments system 112, a payment network orchestration/ID verifier 114, and a payment network merchant services/issuer 116.

The mobile device 104 includes a secure element 106 and an OB application 107. The mobile device 104 is able to communicate with the token provider server computer 108 and the mobile communication network 118. The system 100 enables OB customers to store a token on the mobile device 104 when the OB customer lacks a direct working issuer relationship with a payment network system 102 (e.g., Visa, Mastercard, American Express) for creating tokens. Tokens require close association with the mobile device 104. Accordingly, the mobile communication network 118 operated by a mobile service provider (e.g., AT&T, Verizon, T-Mobile, etc.) is a partner agent for close coupling of tokens for authentication. The system 100 according to at least one aspect of the present disclosure prevents or minimizes frauds that occur more frequently for one-time use tokens (delete and forget) since they can be closely coupled to the mobile device 104.

Prerequisites for the system 100 according at least one aspect of the present disclosure include, for example, include a small scale OB API integrator (e.g., SOFI), the issuer (e.g., Chase), and the mobile service provider. The OB API has an option to initiate tokens on the mobile device 104. The issuer is already enrolled on the payment network system 102 to enable tokenization on the cards for third party financial institutions. The mobile service provider that operates to mobile communication network 118 in United States, for example, by way of agreement is a mobile device 104 alignment trusted partner and is onboarded on the payment network system 102 as a mobile trusted partner.

FIG. 2 is a swimlane diagram of a method 200 for preventing fraud and authenticating users while processing a token on a token provider computer, according to at least one aspect of the present disclosure. According to one aspect of the method 200, a user opens the OB application 107 on the mobile device 104 and enrolls a PAN. The mobile device 104 sends 202 the PAN information and mobile device 104 number to the token provider server computer 108 to create a token. The token provider server computer 108 establishes communication 204 with the payment network token gateway server computer 110 to check for the tokenization by sharing P2 Data+Mobile Device ID+Mobile Device Number, and card validity information. P2 Data may include routine business records, meeting notes, email, and other data that does not include P3/P4 information. The payment network token gateway server computer 110 then checks 206 with the payment network merchant services/issuer 116 to determine whether the token Issuer/Provider is onboarded and the eligible partners are available for the mobile device 104 based on zip code. The payment network token gateway server computer 110 checks 208 with the payment network core payments system 112 for the PAN+Expiry+Zip code validity.

In one aspect, the payment network token gateway server computer 110 sends 210 a pending state token to the token provider server computer 108 (e.g., the token issuer). The token provider server computer 108 responds 212 to the application 107 running on the mobile device 104 with the pending state token to be associated to the mobile device 104. The payment network token gateway server computer 110 checks 214 with the payment network orchestration/ID verifier 114 (e.g., identity verifier) for the eligible partners for the mobile device 104 based on zip code. The payment network orchestration/ID verifier 114 calls 216 the mobile communication network 118 mobile trust partner and sends a token linking a one-time password (OTP) silent push (by sharing the Issuer ID/Mobile number/Application ID). The mobile communication network 118 mobile trust partner sends 218 a silent push to the mobile device 104 based on mobile number using the service provider IMEI mapping; and also will share the OTP silent push to the payment network orchestration/ID verifier 114.

The OB application 107 on the mobile device 104 establishes communication 220 with the token provider server computer 108 to validate the push OTP value. The token provider server computer 108 sends 222 the push OTP value to the payment network token gateway server computer 110 and the payment network token gateway server computer 110 sends 224 the push OTP value to the payment network orchestration/ID verifier 114, which validates the push OTP. Approval of the token association of the mobile device 104 is then sent 226 to the payment network token gateway server computer 110. The payment network token gateway server computer 110 sends 228 the token validated state message to the token provider server computer 108 and the token provider server computer 108 sends 230 the token validated state message to the mobile device 104. The OB application 107 on the mobile device 104 requests 232 the mobile communication network 118 mobile trust partner to associate the token to the mobile device 104. Finally, the mobile communication network 118 mobile trust partner validates 234 with the payment network token gateway server computer 110 and shares the trusted public certificate to the mobile device 104 needed for subsequent token challenge flows.

In one aspect, the token may be challenged when any payment is Initiated with the mobile device 104 and an artificial intelligence (AI) engine recommends a high risk score (based on location/merchant). The OB application 107 running on the mobile device 104 sends the ID verification message to the token provider server computer 108—payment network—mobile communication network 118 mobile trust partner—mobile device 104 (token approved/declined) for transactions. The mobile communication network 118 mobile trust partner sends a silent push to the mobile device 104 based on the certificate share between the mobile device 104 and the mobile communication network 118 mobile trust partner, the token will be approved and allowed for payments.

FIGS. 3-9 below describe various hardware environments suitable for implementing the system 100 for preventing fraud and authenticating users while processing a token on a token provider server computer as shown in FIG. 1, according to at least one aspect of the present disclosure and executing the method 200 for preventing fraud and authenticating users while processing a token on a token provider server computer as shown in FIG. 2, according to at least one aspect of the present disclosure. It will be understood by those skilled in the art that the hardware environments shown in FIGS. 3-9 are merely examples and those skilled in the art will appreciate that the system 100 and method 200 may be implemented in various hardware environments without limiting the scope of the present disclosure and appended claims.

Accordingly, FIG. 3 illustrates a block diagram of a communication device 300 that may be used in various embodiments of the present disclosure. The communication device 300 is representative of the mobile device 104 described in connection with FIGS. 1 and 2, and may be a cell phone, a feature phone, a smart phone, a satellite phone, or a computing device having a phone capability.

The communication device 300 may include a processor 305 (e.g., a microprocessor or microcontroller) for processing the functions of the communication device 300 and a display 320 to allow a user to see the phone numbers and other information and messages. The communication device 300 further may include an input element 325 to allow a user to input information into the device (e.g., input buttons, touch screen, etc.), a speaker 330 to allow the user to hear voice communication, music, etc., and a microphone 335 to allow the user to transmit his or her voice through the communication device 300. The processor 310 of the communication device 300 may connect to a memory 315. The memory 315 may be in the form of a computer-readable medium that stores data and, optionally, computer-executable instructions.

With reference now to FIG. 3 together with FIGS. 1 and 2, the communication device 300 also may include a communication element 340 for connection to communication channels (e.g., a cellular telephone network, data transmission network, Wi-Fi network, satellite-phone network, Internet network, Satellite Internet Network, etc.), and in particular, to the token provider server computer 108 and the mobile communication network 118, for example, as shown in FIGS. 1 and 2. The communication element 340 may include an associated wireless transfer element, such as an antenna. The communication element 340 may include a subscriber identity module (SIM) in the form of an integrated circuit that stores an international mobile subscriber identity and the related key used to identify and authenticate a subscriber using the communication device 300. One or more subscriber identity modules may be removable from the communication device 300 or embedded in the communication device 300.

The communication device 300 further may include a contactless element 350, which is typically implemented in the form of a semiconductor chip (or other data storage element) with an associated wireless transfer element, such as an antenna. The contactless element 350 may be associated with (e.g., embedded within) the communication device 300 and data or control instructions transmitted via a cellular network, such as for example, the mobile communication network 118, and may be applied to the contactless element 350 by means of a contactless element interface (not shown). The contactless element interface may function to permit the exchange of data and/or control instructions between mobile device circuitry (and hence the cellular network) and the contactless element 350.

The contactless element 350 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device 300 and an interrogation device. Thus, the communication device 300 may be capable of communicating and transferring data and/or control instructions via both a cellular network and near field communications capability.

The data stored in the memory 315 may include: operation data relating to the operation of the communication device 300, personal data (e.g., name, date of birth, identification number, etc.), financial data (e.g., bank account information, a bank identification number (BIN), credit or debit card number information, account balance information, expiration date, loyalty provider account numbers, tokens, etc.), transit information (e.g., as in a subway or train pass), access information (e.g., as in access badges), etc. A user may transmit this data from the communication device 300 to selected receivers.

The communication device 300 may be, amongst other things, a notification device that can receive alert messages and access reports, a portable merchant device that can be used to transmit control data identifying a discount to be applied, as well as a portable consumer device that can be used to make payments.

FIG. 4 illustrates an exemplary tokenization environment 400 including a token server computer 401 of a token service provider. With reference now to FIG. 4 together with FIGS. 1 and 2, the token provider server computer 108 may be implemented as the token server computer 401. The token server computer 401 may be in communication with a token requesting party 416 such as, for example, the mobile device 104 as shown in FIGS. 1 and 2. The token requesting party 416 may operate a token requesting party computer such as the mobile device 104. In some embodiments, the token server computer 401 also may be in communication with a transaction processing network computer 414 such as, for example, the payment network system 102 shown in FIGS. 1 and 2. In other embodiments, the token server computer 401 may part of the payment network system 102. In various embodiments, the token server computer 401 is in communication with the payment network token gateway server computer 110.

The token server computer 401 may be responsible for provisioning a token to a user of the mobile device 104 of an account holder using a provisioning module 408 in conjunction with a data processor 403. Provisioning may include creating a token within a token vault 402 for an account, sending the token to the token requesting party 416 and sending the token to a device of the account holder.

According to embodiments directed to payment transactions, the token requesting party 416 may be an open banking account holder using an OB application on their mobile device 104. In some embodiments, the token requesting party 416 may register with the token server computer 401 using an OB application running on the mobile device 104.

The token requesting party 416 (e.g., the mobile device 104 operated by the token requesting party) may provide a set of account identifiers to the token server computer 401. The token server computer 401 may generate (or determine) a token for the account identifier received from the mobile device 104 operated by the token requesting party 416. The generated tokens may be stored at a token vault 402. The token vault 402 also may store a mapping between each token and the account identifier identifying the account represented by the token. The token vault 402 also may be used by the transaction processing network computer 414 to de-tokenize the token and convert the token to the account number represented by the token when a transaction authorization is processed through the transaction processing network computer 414. The token vault 402 may also manage all domain restrictions associated with each token provisioned.

The token requesting party 416 also may select, with the data processor 403 executing the key management module 406 of the token server computer 401, an option associated with encryption keys. For example, the token requesting party 416 may choose to provide the encryption keys to the token server computer 401 via the key management module 406. In some embodiments, the token requesting party 416 may choose to leave the key generation to the token server computer 401. The token server computer 401 may generate (or determine) the tokens based on the option associated with the encryption keys. The token server computer 401 may generate a token associated with at least one encryption key for each account identifier of the set of account identifiers. The token server computer 401 may store the encryption keys along with the associated tokens in the token vault 402. The encryption keys may then be provided to a user device of the account holder. The tokens and corresponding encryption keys may be used in tokenized transactions processed by the transaction processing network computer.

The token requesting party 416 also may initiate a request to receive a message when a token has been generated and/or provisioned for one of the accounts associated with the token requesting party 416. The token server computer 401 may generate a notification using the data processor 403 executing code in the notification module 410 based on the notification criteria (e.g., when a token satisfies the notification criteria) provided by the token requesting party 416. It also may send the notification to the token requesting party 416. For example, the token requesting party 416 may request a notification when a token is generated. The notification module 410 of the token server computer 401 may generate and send a notification to the token requesting party 416 when the token is generated. Similarly, the token requesting party 416 may request a notification when a token is provisioned on a user device. The notification module 410 of the token server computer 401 may generate and send a notification to the token requesting party 416 when the token is provisioned on the user device. For example, the notification module 410 may be informed by the provisioning module 408 that the token has been provisioned on the user device.

The token server computer 401 also may include a risk management module 412 that can work in conjunction with the data processor 403 to set up rules for risk decisioning when the token server computer 401 receives the token provisioning request from the token requesting party 416. As part of further customization of the token generation process, the token requesting party 416 may indicate rules for provisioning or processing the token based on a risk assessment associated with a transacting party, a device used in the transaction, or the account itself. In some embodiments, the token requesting party 416 may provide a restriction that is placed on one or more of the generated tokens based on the risk decision making rules.

The token server computer 401 shown in FIG. 4 is provided for illustration purposes and should not be construed as limiting. The token server computer 401 may include more or less components than those illustrated in FIG. 4. For example, the token server computer 401 may include additional software modules, such as a processing module, a lifecycle management module, etc. These and other modules may, in conjunction with the data processor 403, allow the token server computer 401 to perform one or more of the following functions: map an account identifier to a token and store the mapping in the token vault with relevant domain restrictions; provision a token from the token vault to a user device; manage (e.g., delete, suspend, resume, etc.) the token both at the token vault and on the user device; generate encryption keys based on the token requesting party's request; manage encryption keys based on predetermined criteria; process tokenized transactions including performing cryptogram validation, domain restriction checks, and validity checks; and perform post-transaction verification processing to verify that transactions and account updates are conducted on the user device after the transaction is processed by the transaction processing network.

In some embodiments, the token server computer 401 may support contactless payment use cases. This includes support for contactless payment methods using a secure element and Host Card Emulation (HCE)-based payment applications.

FIG. 5 illustrates a block diagram of a gateway server 500, according to at least one aspect of the present disclosure. With reference to FIG. 5 together with FIGS. 1 and 2, the gateway server 500 is representative of the payment network token gateway server computer 110 shown in FIGS. 1 and 2. The gateway server 500 may comprise hardware and/or software configured to route messages between a resource provider computer and one or more transport computers. The gateway server 500 may include a processor 504 operatively coupled to a network interface 502, a memory 506, and a computer-readable medium 508. The gateway server 500 further may comprise a routing database 516.

The processor 504 may be implemented as one or more integrated circuits (e.g., one or more single core or multicore microprocessors and/or microcontrollers). The processor 504 may be used to control the operation of the gateway server 500. The processor 504 can execute a variety of programs in response to program code or computer-readable code stored in memory 506. The processor 504 may include functionality to maintain multiple concurrently executing programs or processes.

The network interface 502 may be configured to connect to one or more communication networks to allow the gateway server 500 to communicate with other entities such as a resource provider computer, transport computers, routing administration interface, etc. For example, communication with the transport computers can be direct, indirect, and/or via an API.

The memory 506 may be implemented using any combination of any number of non-volatile memories (e.g., flash memory) and volatile memories (e.g., DRAM, SRAM), or any other non-transitory storage medium, or a combination of media.

The computer-readable medium 508 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 208 may be any combination of such storage or transmission devices.

The computer-readable medium 508 may comprise software code stored as a series of instructions or commands. The computer-readable medium 508 comprises code, executable by the processor 504, to implement methods as described herein. The computer-readable medium 508 may comprise a routing manager 510, a real-time network measurement engine 512, and a routing configuration service 514. Each of these modules may include code configured to perform the functions described below in conjunction with the processor 504.

The real-time network measurement engine 512 may include code configured to detect a measure of availability of one or more transport computers. This may involve recording, counting, and/or analyzing handshake messages, authorization response messages, acknowledgement messages, and/or heartbeat messages in order to determine the transport computer's availability. The real-time network measurement engine 512 may communicate with the routing manager 510 to provide the gathered information to the routing manager 510. The routing manager 510 may then use the provided information to route messages to an optimal destination.

The routing configuration service 514 may include code configured to receive and process user-defined routing configuration parameters. The routing configuration service may be in communication with the routing administration interface. The routing configuration service 514 may transmit information to the routing administration interface, so that appropriate configuration options may be displayed to a given resource provider. The routing configuration service 514 may retrieve user-defined rules from the routing administration interface. The routing configuration service 514 may store the user-defined routing rules to the routing database 516.

The routing manager 510 may include code configured to route authorization requests and/or other messages The routing manager may obtain real-time network measurements about one or more transport computers from the real-time network measurement engine 512. The routing manager may obtain user-defined routing preferences from the routing configuration service 514 and/or routing database 516. The routing manager may further obtain static rules from the routing database. Any combination of these factors, along with the additional factors described below, may be used by the routing manager 510 to make a routing decision.

The routing manager 510 may further include code configured to perform analysis for routing decisions. The routing manager 510 may predict an expected volume. An expected volume may be predicted based on recent volume. Alternatively, or additionally, an expected volume may be predicted based on historical volume analysis. The routing manager 510 may compare historical parameters, retrieved and stored in the course of processing prior authorization requests, with corresponding parameters corresponding to a current authorization request.

The routing manager 510 further may include code configured to process authorization requests and responses. This may involve interpreting the contents of the message to determine the message's final recipient and an authorization status. It may also involve storing some or all of the information in a database, such as routing database 516, for future access. The routing manager 510 may additionally decrypt or encrypt authorization requests and responses. As an example, the routing manager 510 may decrypt an authorization response message in order to extract and interpret the content of the message. Before the authorization response message is sent to the appropriate resource provider computer, the routing manager 510 may encrypt the message again for safe transmission.

The routing manager 510 may further prepare messages for routing to the selected destination. This may involve evaluating network addresses, and determining an appropriate communication protocol or standard. Further, routing manager 510 may format the authorization requests or responses such that they conform to the appropriate communication protocol. As an example, routing manager 510 may determine that routing an authorization request to the transport computer requires the use of the Transmission Control Protocol, and the message should conform to ISO 8583. The routing manager 510 may format the message such that it confirms to both the protocol and the standard, then route the message to the transport computer for further processing. If a request is determined to be fraudulent, routing manager 510 may send an authorization response message to the merchant computer system, indicating that the request has been denied.

The routing database 516 may be a be a storage unit and/or device (e.g., a file system, database, collection of tables, or other storage mechanism) for storing data. The routing database 516 may store routing rules. Such rules may be stored in association with a plurality of different resource providers. Each of the resource providers may define their own routing preferences (e.g., via the routing administration interface). Alternatively, or additionally, the routing database 516 may store general rules (e.g., route to transport computer expected to process the request fastest, and/or route to the lowest-cost transport computer).

In some embodiments, the gateway server 500 further may include hardware and/or software configured to analyze transaction data to identify whether specified criteria are met or otherwise conduct a fraud evaluation for a request to access a resource. If the gateway server 500 determines that the transaction may be fraudulent, then gateway server 500 may determine that the transaction should be denied and not forwarded to other network entities for the purpose of obtaining an authorization response message. If the gateway server 500 determines that the transaction is not fraudulent, then the gateway server 500 may determine that the transaction should be allowed. If the gateway server 500 is unable to determine whether the transaction is fraudulent, then the gateway server 500 may send the transaction to the transport computer or the processing network for further review.

The underlying components of the system 100 shown in FIG. 1, may be implemented in accordance with computer implemented technology including smartphones, tablet computers, servers, databases and the like interconnected over general purposes worldwide networks (e.g., Internet) using the computer technology such as a computer apparatus 3000 described below in connection with FIG. 6 and/or a computer system 4000 comprising a host machine described below in connection with FIG. 7.

FIG. 6 illustrates a block diagram of a computer apparatus 3000 with data processing subsystems or components, according to at least one aspect of the present disclosure. The subsystems shown in FIG. 6 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 7 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multiprocessor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4028 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The following methods 600, 700, 800 may be executed in the system 100 environment depicted in FIG. 1 by the hardware components depicted in FIGS. 3-7, for example. For conciseness and clarity of disclosure, the methods 600, 700, 800 will described with reference to the system 100 depicted in FIG. 1. Those skilled in the art will appreciate that the components of the system 100 may implemented as described above in connection with FIGS. 3-7.

Turning now to FIG. 8 together with FIG. 1, FIG. 8 depicts a method 600 of preventing fraud and authenticating users while processing a token on a token provider server computer 108, according to at least one aspect of the present disclosure. According to one aspect of the method 600, the token provider server computer 108 receives 602 a personal account number (PAN) information and a mobile device number from a banking application 107 running on a mobile device 104. The token provider server computer 108 enrolls 604 the PAN information and the mobile device number. The token provider server computer 108 establishes communication 606 with a token gateway server computer 110 to determine a tokenization of card details with a token during a financial transaction process. The token provider server computer 108 receives 608 a pending state token from the token gateway server computer 110 upon completion of validation of the PAN, a card expiry information, and a card postal code. The token provider server computer 108 transmits 610 the pending state token to the banking application 107 running on the mobile device 104 to associate the pending state token with the mobile device 104. The token provider server computer 108 receives 612 a validation request from the banking application 107 for a push one-time password (OTP) value. The token provider server computer 108 transmits 614 the push OTP to the token gateway server computer 110. The token provider server computer 108 receives 616 a token validated state message from the token gateway server computer 110.

In another aspect of the method 600, the banking application 107 running on the mobile device 104 is an open banking application.

In another aspect of the method 600, the token provider server computer 108 shares the PAN information, the mobile device number, a mobile device identification, and card validity with the token gateway server computer 110.

In another aspect of the method 600, the token provider server computer 108 transmits the token validated state message to the mobile device 104.

In another aspect of the method 600, a token is created on the mobile device 104 based on the PAN information and the mobile device number.

In another aspect of the method 600, the token provider server computer 108 receives a notification of a high risk transaction from the banking application 107 and declines the token for the high risk transaction.

Turning now to FIG. 9 together with FIG. 1, FIG. 9 depicts a method 700 of preventing fraud and authenticating users while processing a token on a token gateway server computer 110, according to at least one aspect of the present disclosure. According to one aspect of the method 700, a token gateway server computer 110 receives 702 a personal account number (PAN) information, a mobile device number, a mobile device identification, and a card validity from a token provider server computer 108. The token gateway server computer 110 determines 704 whether a token issuer is onboarded. The token gateway server computer 100 validates 706 the PAN information, a card expiry information, and a card postal code. The token gateway server computer 110 transmits 708 a pending state token to the token provider server computer 108 upon completion of validation of the PAN information, the card expiry information, and the card postal code. The token gateway server computer 110 receives 710 a push one-time password (OTP) value from the token provider server computer 108. The token gateway server computer 110 transmits 712 the push OTP value to an identity verifier 114 to validate the push OTP. The token gateway server computer 110 receives 714 approval of the token association of the mobile device 104. The token gateway server computer 110 transmits 716 a token validated state message to the token provider server computer 110 and to the mobile device 104. The token gateway server computer 110 receives 718 a validation from the identity verifier 114. The token gateway server computer 110 shares 720 a trusted public certificate to the mobile device for token challenge flows.

In another aspect of the method 700, the token gateway server computer 110 determines a tokenization of card details with a token during a financial transaction.

In another aspect of the method 700, an eligible mobile network provider for the mobile device number is verified based on the card postal code.

In another aspect of the method 700 the token gateway server computer 110 determines a mobile network provider based on the card postal code via an identity verifier.

In another aspect of the method 700, the PAN information, a card expiry information, and a card postal code is validated via a core payment network system.

In another aspect of the method 700, the token gateway computer 110 checks with a payment network merchant services/issuer 117 to determine whether a token issuer/provider is onboarded and eligible partners are available for the mobile device based on zip code.

Turning now to FIG. 10 together with FIG. 1, FIG. 10 depicts a method 800 of preventing fraud and authenticating users while processing a token on a mobile device 104, according to at least one aspect of the present disclosure. According to one aspect of the method 800, the mobile device 104 enrolls 802 personal account number (PAN) information using the banking application 107 running on the mobile device 104. The mobile device 104 transmits 804 the PAN information and a mobile device number to the token provider server computer 108 to create a token. The mobile device 104 receives 806 a pending state token to associate with the mobile device 104 by the banking application 107. The mobile device 104 receives 808 a token linking a one-time password (OTP) value through a silent push notification from a mobile network provider through the mobile communication network 118. The mobile device 104 establishes communication 810 with the token provider server computer 108. The mobile device 104 receives 812 a token validated state message from the token gateway server computer 110. The mobile device requests 814 from the mobile network provider to associate the token to the mobile device 104 by the banking application 107. The mobile device 104 receives 816 a trusted public certificate from the mobile network provider through the mobile communication network 118.

In another aspect of the method 800, the banking application 107 is an open banking application.

In another aspect of the method 800, the mobile device 104 receives the token linking the OTP value through the silent push notification from the mobile network provider through the mobile communication network 118 using a service provider international mobile equipment identity (IMEI) mapping.

In another aspect of the method 800, the token provider server computer 108 validates the push OTP value by the banking application 107.

In another aspect of the method 800, the trusted public certificate from the mobile network provider and the mobile device 104 is shared, the token is approved, and the token is allowed to be used for payments.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term “logic” may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms “component,” “system,” “module” and the like can refer to a computer-related entity, either hardware, a combination of hardware and software, software, or software in execution.

As used in any aspect herein, an “algorithm” refers to a self-consistent sequence of steps leading to a desired result, where a “step” refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method of preventing fraud and authenticating users while processing a token from a third-party banking application on a token provider server computer, the method comprising:

receiving, by the token provider server computer, a request for the token from the third-party banking application, the request for the token comprising a personal account number (PAN) information associated with the third-party banking application, a mobile device number, a mobile device identification, a card validity information, and a card postal code, wherein the card validity information is related to a card associated with the third-party banking application;

enrolling, by the token provider server computer, the PAN information, the mobile device number, the mobile device identification, the card validity information, and the card postal code;

sharing, by the token provider server computer, the PAN information, the mobile device number, the mobile device identification, the card validity information, and the card postal code with the token gateway server computer, wherein the token gateway server computer validates the PAN information, the card validity information, and the card postal code;

receiving, by the token provider server computer, a pending state token from the token gateway server computer upon completion of validation of the PAN information, the card validity information, and the card postal code;

transmitting, by the token provider server computer, the pending state token to the third-party banking application running on a mobile device to associate the pending state token with the mobile device;

receiving, by the token provider server computer, a token validation request from the third-party banking application, the token validation request comprising a push one time password (OTP) value;

transmitting, by the token provider server computer, the push OTP to the token gateway server computer, wherein the token gateway server computer validates the push OTP;

receiving, by the token provider server computer, a token validated state message from the token gateway server computer; and sending, by the token provider server computer, the token validated state message to the mobile device.

2. The method of claim 1, wherein the third-party banking application running on the mobile device is an open banking application.

3. The method of claim 1, comprising creating the token based on the PAN information and the mobile device number on the mobile device.

4. The method of claim 1, comprising:

receiving, by the token provider server computer, from the third-party banking application a notification of a high risk transaction; and declining the token for the high risk transaction.

5. The method of claim 1, the method further comprising:

generating an application proxy interface instance associated with the third-party banking application on the mobile device; and sending the request for the token based on a user input at the third-party banking application, the request comprising the PAN information, the mobile device number, the mobile device identification, the card validity information, and the card postal code to the token provider server computer.

6. The method of claim 1, wherein the third-party banking application on the mobile device requests an eligible mobile network provider to associate the token validated state message to the mobile device; and wherein the eligible mobile network provider validates with the token gateway server computer and shares a trusted public certificate to the mobile device needed for subsequent token challenge flows.

7. The method of claim 1, wherein the token gateway server computer is associated with a payment network of the card.

8. The method of claim 7, wherein the user does not have a direct relationship with a card issuer and the payment network for creating tokens.

9. The method of claim 8, wherein the card issuer is enrolled on the payment network to enable tokenization on the card for the third-party banking application.

* * * * *